US012670003B2

(12) United States Patent
Deen et al.

(10) Patent No.: US 12,670,003 B2
(45) Date of Patent: Jun. 30, 2026

(54) DATA CENTER TRAFFIC ANALYTICS SYNCHRONIZATION

(71) Applicant: Cisco Technology, Inc., San Jose, CA (US)

(72) Inventors: Khawar Deen, Sunnyvale, CA (US); Navindra Yadav, Cupertino, CA (US); Anubhav Gupta, Fremont, CA (US); Shashidhar Gandham, Fremont, CA (US); Rohit Chandra Prasad, Sunnyvale, CA (US); Abhishek Ranjan Singh, Pleasanton, CA (US); Shih-Chun Chang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 128 days.

(21) Appl. No.: 17/570,179

(22) Filed: Jan. 6, 2022

(65) Prior Publication Data

US 2022/0131773 A1      Apr. 28, 2022

Related U.S. Application Data

(63) Continuation of application No. 16/741,528, filed on Jan. 13, 2020, now Pat. No. 11,252,060, which is a
(Continued)

(51) Int. Cl.
*G06F 9/455* (2018.01)
*G06F 3/0482* (2013.01)
(Continued)

(52) U.S. Cl.
CPC ........ *G06F 9/45558* (2013.01); *G06F 3/0482* (2013.01); *G06F 3/04842* (2013.01);
(Continued)

(58) Field of Classification Search
CPC . H04L 43/0858; H04L 43/065; H04L 43/026; H04L 43/106; H04L 45/02; G06F 15/167
See application file for complete search history.

(56) References Cited

U.S. PATENT DOCUMENTS

| | | | |
|---|---|---|---|
| 5,086,385 A | 2/1992 | Launey et al. | |
| 5,319,754 A | 6/1994 | Meinecke et al. | |
| (Continued) | | | |

FOREIGN PATENT DOCUMENTS

| | | | |
|---|---|---|---|
| CA | 2884785 C | 10/2022 | |
| CN | 1486555 A | 3/2004 | |
| (Continued) | | | |

OTHER PUBLICATIONS

Ananthanarayanan R., et al., "Photon: Fault-tolerant and Scalable Joining of Continuous Data Streams," Proceedings of the ACM SIGMOD International Conference on Management of Data, New York, USA, Jun. 22-27, 2013, pp. 577-588.
(Continued)

*Primary Examiner* — Barbara B Anyan
(74) *Attorney, Agent, or Firm* — Polsinelli P.C.

(57) ABSTRACT

A network analytics system can receive first sensor data, including first network activity and a first timestamp associated with a first clock of a first node, and second sensor data, including second network activity and a second timestamp associated with a second clock of a second node. The system can determine a first delta between the first clock and a third clock based on the first timestamp, and a second delta between the second clock and the third clock. The system can determine a first communication latency associated with a first sensor of the first node, and a second communication latency associated with a second sensor of the second node. The system can generate a report that synchronizes one or more data flows between the first node and the second node
(Continued)

based on the first delta, the second delta, the first communication latency, and the second communication latency.

19 Claims, 8 Drawing Sheets

Related U.S. Application Data continuation of application No. 15/040,829, filed on Feb. 10, 2016, now Pat. No. 10,536,357.

(60) Provisional application No. 62/171,899, filed on Jun. 5, 2015.

(51) Int. Cl.

| | |
|---|---|
| *G06F 3/04842* | (2022.01) |
| *G06F 3/04847* | (2022.01) |
| *G06F 16/11* | (2019.01) |
| *G06F 16/13* | (2019.01) |
| *G06F 16/16* | (2019.01) |
| *G06F 16/17* | (2019.01) |
| *G06F 16/174* | (2019.01) |
| *G06F 16/23* | (2019.01) |
| *G06F 16/2457* | (2019.01) |
| *G06F 16/248* | (2019.01) |
| *G06F 16/28* | (2019.01) |
| *G06F 16/29* | (2019.01) |
| *G06F 16/9535* | (2019.01) |
| *G06F 21/53* | (2013.01) |
| *G06F 21/55* | (2013.01) |
| *G06F 21/56* | (2013.01) |
| *G06N 20/00* | (2019.01) |
| *G06N 99/00* | (2019.01) |
| *G06T 11/26* | (2026.01) |
| *H04J 3/06* | (2006.01) |
| *H04J 3/14* | (2006.01) |
| *H04L 1/24* | (2006.01) |
| *H04L 7/10* | (2006.01) |
| *H04L 9/08* | (2006.01) |
| *H04L 9/32* | (2006.01) |
| *H04L 9/40* | (2022.01) |
| *H04L 41/046* | (2022.01) |
| *H04L 41/0668* | (2022.01) |
| *H04L 41/0803* | (2022.01) |
| *H04L 41/0806* | (2022.01) |
| *H04L 41/0816* | (2022.01) |
| *H04L 41/0893* | (2022.01) |
| *H04L 41/0894* | (2022.01) |
| *H04L 41/12* | (2022.01) |
| *H04L 41/16* | (2022.01) |
| *H04L 41/22* | (2022.01) |
| *H04L 41/40* | (2022.01) |
| *H04L 43/02* | (2022.01) |
| *H04L 43/026* | (2022.01) |
| *H04L 43/04* | (2022.01) |
| *H04L 43/045* | (2022.01) |
| *H04L 43/062* | (2022.01) |
| *H04L 43/08* | (2022.01) |
| *H04L 43/0805* | (2022.01) |
| *H04L 43/0811* | (2022.01) |
| *H04L 43/0829* | (2022.01) |
| *H04L 43/0852* | (2022.01) |
| *H04L 43/0864* | (2022.01) |
| *H04L 43/0876* | (2022.01) |
| *H04L 43/0882* | (2022.01) |
| *H04L 43/0888* | (2022.01) |
| *H04L 43/10* | (2022.01) |
| *H04L 43/106* | (2022.01) |
| *H04L 43/12* | (2022.01) |
| *H04L 43/16* | (2022.01) |
| *H04L 43/20* | (2022.01) |
| *H04L 45/00* | (2022.01) |
| *H04L 45/302* | (2022.01) |
| *H04L 45/50* | (2022.01) |
| *H04L 45/74* | (2022.01) |
| *H04L 47/11* | (2022.01) |
| *H04L 47/20* | (2022.01) |
| *H04L 47/2441* | (2022.01) |
| *H04L 47/2483* | (2022.01) |
| *H04L 47/28* | (2022.01) |
| *H04L 47/31* | (2022.01) |
| *H04L 47/32* | (2022.01) |
| *H04L 61/5007* | (2022.01) |
| *H04L 67/01* | (2022.01) |
| *H04L 67/10* | (2022.01) |
| *H04L 67/1001* | (2022.01) |
| *H04L 67/12* | (2022.01) |
| *H04L 67/51* | (2022.01) |
| *H04L 67/75* | (2022.01) |
| *H04L 69/16* | (2022.01) |
| *H04L 69/22* | (2022.01) |
| *H04W 72/54* | (2023.01) |
| *H04W 84/18* | (2009.01) |
| *H04L 67/50* | (2022.01) |

(52) U.S. Cl.

CPC ........ *G06F 3/04847* (2013.01); *G06F 16/122* (2019.01); *G06F 16/137* (2019.01); *G06F 16/162* (2019.01); *G06F 16/17* (2019.01); *G06F 16/173* (2019.01); *G06F 16/174* (2019.01); *G06F 16/1744* (2019.01); *G06F 16/1748* (2019.01); *G06F 16/2322* (2019.01); *G06F 16/235* (2019.01); *G06F 16/2365* (2019.01); *G06F 16/24578* (2019.01); *G06F 16/248* (2019.01); *G06F 16/285* (2019.01); *G06F 16/288* (2019.01); *G06F 16/29* (2019.01); *G06F 16/9535* (2019.01); *G06F 21/53* (2013.01); *G06F 21/552* (2013.01); *G06F 21/556* (2013.01); *G06F 21/566* (2013.01); *G06N 20/00* (2019.01); *G06N 99/00* (2013.01); *G06T 11/26* (2026.01); *H04J 3/0661* (2013.01); *H04J 3/14* (2013.01); *H04L 1/242* (2013.01); *H04L 7/10* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/0894* (2022.05); *H04L 41/12* (2013.01); *H04L 41/16* (2013.01); *H04L 41/22* (2013.01); *H04L 41/40* (2022.05); *H04L 43/02* (2013.01); *H04L 43/026* (2013.01); *H04L 43/04* (2013.01); *H04L 43/045* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106*

(2013.01); *H04L 43/12* (2013.01); *H04L 43/16* (2013.01); *H04L 43/20* (2022.05); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/5007* (2022.05); *H04L 63/0227* (2013.01); *H04L 63/0263* (2013.01); *H04L 63/06* (2013.01); *H04L 63/0876* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/145* (2013.01); *H04L 63/1458* (2013.01); *H04L 63/1466* (2013.01); *H04L 63/16* (2013.01); *H04L 63/20* (2013.01); *H04L 67/01* (2022.05); *H04L 67/10* (2013.01); *H04L 67/1001* (2022.05); *H04L 67/12* (2013.01); *H04L 67/51* (2022.05); *H04L 67/75* (2022.05); *H04L 69/16* (2013.01); *H04L 69/22* (2013.01); *H04W 72/54* (2023.01); *H04W 84/18* (2013.01); *G06F 2009/4557* (2013.01); *G06F 2009/45587* (2013.01); *G06F 2009/45591* (2013.01); *G06F 2009/45595* (2013.01); *G06F 2221/033* (2013.01); *G06F 2221/2101* (2013.01); *G06F 2221/2105* (2013.01); *G06F 2221/2111* (2013.01); *G06F 2221/2115* (2013.01); *G06F 2221/2145* (2013.01); *H04L 67/535* (2022.05)

(56) References Cited

U.S. PATENT DOCUMENTS

| | | | |
|---|---|---|---|
| 5,400,246 A | 3/1995 | Wilson et al. | |
| 5,436,909 A | 7/1995 | Dev et al. | |
| 5,448,724 A | 9/1995 | Hayashi | |
| 5,555,416 A | 9/1996 | Owens et al. | |
| 5,726,644 A | 3/1998 | Jednacz et al. | |
| 5,742,803 A | 4/1998 | Igarashi et al. | |
| 5,742,829 A | 4/1998 | Davis et al. | |
| 5,751,914 A | 5/1998 | Coley et al. | |
| 5,794,047 A | 8/1998 | Meier | |
| 5,822,731 A | 10/1998 | Schultz | |
| 5,831,848 A | 11/1998 | Rielly et al. | |
| 5,903,545 A | 5/1999 | Sabourin et al. | |
| 5,949,974 A | 9/1999 | Ewing et al. | |
| 6,012,096 A | 1/2000 | Link et al. | |
| 6,026,362 A | 2/2000 | Kim et al. | |
| 6,085,243 A | 7/2000 | Fletcher et al. | |
| 6,115,462 A | 9/2000 | Servi et al. | |
| 6,141,595 A | 10/2000 | Gloudeman et al. | |
| 6,144,962 A | 11/2000 | Weinberg et al. | |
| 6,192,402 B1 | 2/2001 | Iwase | |
| 6,204,850 B1 | 3/2001 | Green | |
| 6,215,898 B1 | 4/2001 | Woodfill et al. | |
| 6,226,273 B1 | 5/2001 | Busuioc et al. | |
| 6,230,312 B1 | 5/2001 | Hunt | |
| 6,239,699 B1 | 5/2001 | Ronnen | |
| 6,247,058 B1 | 6/2001 | Miller et al. | |
| 6,249,241 B1 | 6/2001 | Jordan et al. | |
| 6,279,035 B1 | 8/2001 | Brown et al. | |
| 6,295,527 B1 | 9/2001 | McCormack et al. | |
| 6,307,837 B1 | 10/2001 | Ichikawa et al. | |
| 6,330,562 B1 | 12/2001 | Boden et al. | |
| 6,338,131 B1 | 1/2002 | Dillon | |
| 6,351,843 B1 | 2/2002 | Berkley et al. | |
| 6,353,775 B1 | 3/2002 | Nichols | |
| 6,381,735 B1 | 4/2002 | Hunt | |
| 6,499,137 B1 | 12/2002 | Hunt | |
| 6,525,658 B2 | 2/2003 | Streetman et al. | |
| 6,546,420 B1 | 4/2003 | Lemler et al. | |
| 6,546,553 B1 | 4/2003 | Hunt | |
| 6,597,663 B1 | 7/2003 | Rekhter | |
| 6,611,896 B1 | 8/2003 | Mason, Jr. et al. | |
| 6,629,123 B1 | 9/2003 | Hunt | |
| 6,633,909 B1 | 10/2003 | Barrett et al. | |
| 6,654,750 B1 | 11/2003 | Adams et al. | |
| 6,718,414 B1 | 4/2004 | Doggett | |
| 6,728,779 B1 | 4/2004 | Griffin et al. | |
| 6,751,663 B1 | 6/2004 | Farrell et al. | |
| 6,774,899 B1 | 8/2004 | Ryall et al. | |
| 6,801,878 B1 | 10/2004 | Hintz et al. | |
| 6,816,461 B1 | 11/2004 | Scrandis et al. | |
| 6,847,993 B1 | 1/2005 | Novaes et al. | |
| 6,848,106 B1 | 1/2005 | Hipp | |
| 6,925,490 B1 | 8/2005 | Novaes et al. | |
| 6,958,998 B2 | 10/2005 | Shorey | |
| 6,965,861 B1 | 11/2005 | Dailey et al. | |
| 6,983,323 B2 | 1/2006 | Cantrell et al. | |
| 6,996,808 B1 | 2/2006 | Niewiadomski et al. | |
| 6,996,817 B2 | 2/2006 | Birum et al. | |
| 6,999,452 B1 | 2/2006 | Drummond-Murray et al. | |
| 7,002,464 B2 | 2/2006 | Bruemmer et al. | |
| 7,024,468 B1 | 4/2006 | Meyer et al. | |
| 7,036,049 B2 | 4/2006 | Ali et al. | |
| 7,089,583 B2 | 8/2006 | Mehra et al. | |
| 7,096,368 B2 | 8/2006 | Kouznetsov et al. | |
| 7,111,055 B2 | 9/2006 | Falkner | |
| 7,120,934 B2 | 10/2006 | Ishikawa | |
| 7,133,923 B2 | 11/2006 | MeLampy et al. | |
| 7,162,643 B1 | 1/2007 | Sankaran et al. | |
| 7,167,483 B1 | 1/2007 | Sharma et al. | |
| 7,181,769 B1 | 2/2007 | Keanini et al. | |
| 7,185,103 B1 | 2/2007 | Jain | |
| 7,194,664 B1 | 3/2007 | Fung et al. | |
| 7,203,740 B1 | 4/2007 | Putzolu et al. | |
| 7,213,068 B1 | 5/2007 | Kohli et al. | |
| 7,263,689 B1 | 8/2007 | Edwards et al. | |
| 7,296,288 B1 | 11/2007 | Hill et al. | |
| 7,302,487 B2 | 11/2007 | Ylonen et al. | |
| 7,327,735 B2 | 2/2008 | Robotham et al. | |
| 7,331,060 B1 | 2/2008 | Ricciulli | |
| 7,337,206 B1 | 2/2008 | Wen et al. | |
| 7,349,761 B1 | 3/2008 | Cruse | |
| 7,353,507 B2 | 4/2008 | Gazdik et al. | |
| 7,353,511 B1 | 4/2008 | Ziese | |
| 7,356,679 B1 | 4/2008 | Le et al. | |
| 7,360,072 B1 | 4/2008 | Soltis et al. | |
| 7,370,092 B2 | 5/2008 | Aderton et al. | |
| 7,395,195 B2 | 7/2008 | Suenbuel et al. | |
| 7,444,404 B2 | 10/2008 | Wetherall et al. | |
| 7,453,879 B1 | 11/2008 | Lo | |
| 7,454,486 B2 | 11/2008 | Kaler et al. | |
| 7,466,681 B2 | 12/2008 | Ashwood-Smith et al. | |
| 7,467,205 B1 | 12/2008 | Dempster et al. | |
| 7,469,290 B1 | 12/2008 | Liubovich et al. | |
| 7,496,040 B2 | 2/2009 | Seo | |
| 7,496,575 B2 | 2/2009 | Buccella et al. | |
| 7,496,661 B1 | 2/2009 | Morford et al. | |
| 7,523,178 B2 | 4/2009 | Reeves et al. | |
| 7,523,465 B2 | 4/2009 | Aamodt et al. | |
| 7,523,493 B2 | 4/2009 | Liang et al. | |
| 7,530,105 B2 | 5/2009 | Gilbert et al. | |
| 7,539,770 B2 | 5/2009 | Meier | |
| 7,568,107 B1 | 7/2009 | Rathi et al. | |
| 7,571,478 B2 | 8/2009 | Munson et al. | |
| 7,606,203 B1 | 10/2009 | Shabtay et al. | |
| 7,610,330 B1 | 10/2009 | Quinn et al. | |
| 7,633,942 B2 | 12/2009 | Bearden et al. | |
| 7,644,438 B1 | 1/2010 | Dash et al. | |
| 7,676,570 B2 | 3/2010 | Levy et al. | |
| 7,681,131 B1 | 3/2010 | Quarterman et al. | |
| 7,693,947 B2 | 4/2010 | Judge et al. | |
| 7,742,406 B1 | 6/2010 | Muppala | |
| 7,742,413 B1* | 6/2010 | Bugenhagen | H04L 43/026 |
| | | | 370/231 |
| 7,743,242 B2 | 6/2010 | Oberhaus et al. | |
| 7,752,307 B2 | 7/2010 | Takara | |

(56) References Cited

U.S. PATENT DOCUMENTS

| | | | |
|---|---|---|---|
| 7,774,498 B1 | 8/2010 | Kraemer et al. | |
| 7,783,457 B2 | 8/2010 | Cunningham | |
| 7,787,480 B1 | 8/2010 | Mehta et al. | |
| 7,788,477 B1 | 8/2010 | Huang et al. | |
| 7,808,897 B1 | 10/2010 | Mehta et al. | |
| 7,813,822 B1 | 10/2010 | Hoffberg | |
| 7,840,618 B2 | 11/2010 | Zhang et al. | |
| 7,844,696 B2 | 11/2010 | Labovitz et al. | |
| 7,844,744 B2 | 11/2010 | Abercrombie et al. | |
| 7,864,707 B2 | 1/2011 | Dimitropoulos et al. | |
| 7,870,204 B2 | 1/2011 | LeVasseur et al. | |
| 7,873,025 B2 | 1/2011 | Patel et al. | |
| 7,873,074 B1 | 1/2011 | Boland | |
| 7,874,001 B2 | 1/2011 | Beck et al. | |
| 7,885,197 B2 | 2/2011 | Metzler | |
| 7,895,649 B1 | 2/2011 | Brook et al. | |
| 7,904,420 B2 | 3/2011 | Ianni | |
| 7,930,752 B2 | 4/2011 | Hertzog et al. | |
| 7,934,248 B1 | 4/2011 | Yehuda et al. | |
| 7,957,934 B2 | 6/2011 | Greifeneder | |
| 7,961,637 B2 | 6/2011 | McBeath | |
| 7,970,946 B1 | 6/2011 | Djabarov et al. | |
| 7,975,035 B2 | 7/2011 | Popescu et al. | |
| 7,990,847 B1 | 8/2011 | Leroy et al. | |
| 8,001,610 B1 | 8/2011 | Chickering et al. | |
| 8,005,935 B2 | 8/2011 | Pradhan et al. | |
| 8,040,232 B2 | 10/2011 | Oh et al. | |
| 8,040,822 B2 | 10/2011 | Proulx et al. | |
| 8,040,832 B2 | 10/2011 | Nishio et al. | |
| 8,056,134 B1 | 11/2011 | Ogilvie | |
| 8,069,470 B1 | 11/2011 | Montenegro | |
| 8,115,617 B2 | 2/2012 | Thubert et al. | |
| 8,135,657 B2 | 3/2012 | Kapoor et al. | |
| 8,135,847 B2 | 3/2012 | Pujol et al. | |
| 8,156,430 B2 | 4/2012 | Newman | |
| 8,160,063 B2 | 4/2012 | Maltz et al. | |
| 8,179,809 B1 | 5/2012 | Eppstein et al. | |
| 8,181,248 B2 | 5/2012 | Oh et al. | |
| 8,181,253 B1 | 5/2012 | Zaitsev et al. | |
| 8,185,343 B1 | 5/2012 | Fitzgerald et al. | |
| 8,185,824 B1 | 5/2012 | Mitchell et al. | |
| 8,239,365 B2 | 8/2012 | Salman | |
| 8,239,915 B1 | 8/2012 | Satish et al. | |
| 8,250,657 B1 | 8/2012 | Nachenberg et al. | |
| 8,255,972 B2 | 8/2012 | Azagury et al. | |
| 8,266,697 B2 | 9/2012 | Coffman | |
| 8,272,875 B1 | 9/2012 | Jurmain | |
| 8,280,683 B2 | 10/2012 | Finkler | |
| 8,281,397 B2 | 10/2012 | Vaidyanathan et al. | |
| 8,291,495 B1 | 10/2012 | Burns et al. | |
| 8,296,847 B2 | 10/2012 | Mendonca et al. | |
| 8,311,973 B1 | 11/2012 | Zadeh | |
| 8,312,540 B1 | 11/2012 | Kahn et al. | |
| 8,339,959 B1 | 12/2012 | Moisand et al. | |
| 8,356,007 B2 | 1/2013 | Larson et al. | |
| 8,365,005 B2 | 1/2013 | Bengtson et al. | |
| 8,365,286 B2 | 1/2013 | Poston | |
| 8,370,407 B1 | 2/2013 | Devarajan et al. | |
| 8,381,289 B1 | 2/2013 | Pereira et al. | |
| 8,391,270 B2 | 3/2013 | Van Der Stok et al. | |
| 8,407,164 B2 | 3/2013 | Malik et al. | |
| 8,407,798 B1 | 3/2013 | Lotem et al. | |
| 8,413,235 B1 | 4/2013 | Chen et al. | |
| 8,442,073 B2 | 5/2013 | Skubacz et al. | |
| 8,451,731 B1 | 5/2013 | Lee et al. | |
| 8,462,212 B1 * | 6/2013 | Kundu | G07G 1/0081 |
| | | | 348/150 |
| 8,463,860 B1 | 6/2013 | Guruswamy et al. | |
| 8,489,765 B2 | 7/2013 | Vasseur et al. | |
| 8,494,985 B1 | 7/2013 | Keralapura et al. | |
| 8,499,348 B1 | 7/2013 | Rubin | |
| 8,516,590 B1 | 8/2013 | Ranadive et al. | |
| 8,527,977 B1 | 9/2013 | Cheng et al. | |
| 8,549,635 B2 | 10/2013 | Muttik et al. | |
| 8,565,109 B1 | 10/2013 | Poovendran et al. | |
| 8,570,861 B1 | 10/2013 | Brandwine et al. | |
| 8,572,600 B2 | 10/2013 | Chung et al. | |
| 8,572,734 B2 | 10/2013 | McConnell et al. | |
| 8,572,735 B2 | 10/2013 | Ghosh et al. | |
| 8,572,739 B1 | 10/2013 | Cruz et al. | |
| 8,578,491 B2 | 11/2013 | McNamee et al. | |
| 8,588,081 B2 | 11/2013 | Salam et al. | |
| 8,595,709 B2 | 11/2013 | Rao et al. | |
| 8,600,726 B1 | 12/2013 | Varshney et al. | |
| 8,612,530 B1 | 12/2013 | Sapovalovs et al. | |
| 8,613,084 B2 | 12/2013 | Dalcher | |
| 8,615,803 B2 | 12/2013 | Dacier et al. | |
| 8,624,898 B1 | 1/2014 | Bugaj et al. | |
| 8,630,316 B2 | 1/2014 | Haba | |
| 8,631,464 B2 | 1/2014 | Belakhdar et al. | |
| 8,640,086 B2 | 1/2014 | Bonev et al. | |
| 8,656,493 B2 | 2/2014 | Capalik | |
| 8,661,544 B2 | 2/2014 | Yen et al. | |
| 8,677,487 B2 | 3/2014 | Balupari et al. | |
| 8,683,389 B1 | 3/2014 | Bar-Yam et al. | |
| 8,689,172 B2 | 4/2014 | Amaral et al. | |
| 8,706,914 B2 | 4/2014 | Duchesneau | |
| 8,713,676 B2 | 4/2014 | Pandrangi et al. | |
| 8,719,452 B1 * | 5/2014 | Ding | H04N 21/4344 |
| | | | 709/248 |
| 8,719,835 B2 | 5/2014 | Kanso et al. | |
| 8,750,287 B2 | 6/2014 | Bui et al. | |
| 8,752,042 B2 | 6/2014 | Ratica | |
| 8,752,179 B2 | 6/2014 | Zaitsev | |
| 8,755,396 B2 | 6/2014 | Sindhu et al. | |
| 8,762,951 B1 * | 6/2014 | Kosche | G06F 11/3476 |
| | | | 717/127 |
| 8,769,084 B2 | 7/2014 | Westerfeld et al. | |
| 8,775,577 B1 | 7/2014 | Alford et al. | |
| 8,776,180 B2 | 7/2014 | Kumar et al. | |
| 8,779,921 B1 | 7/2014 | Curtiss | |
| 8,793,255 B1 | 7/2014 | Bilinski et al. | |
| 8,805,946 B1 | 8/2014 | Glommen | |
| 8,812,448 B1 | 8/2014 | Anderson et al. | |
| 8,812,725 B2 | 8/2014 | Kulkarni | |
| 8,813,236 B1 | 8/2014 | Saha et al. | |
| 8,825,848 B1 | 9/2014 | Dotan et al. | |
| 8,832,013 B1 | 9/2014 | Adams et al. | |
| 8,832,103 B2 | 9/2014 | Isaacson et al. | |
| 8,832,461 B2 | 9/2014 | Saroiu et al. | |
| 8,849,926 B2 | 9/2014 | Marzencki et al. | |
| 8,881,258 B2 | 11/2014 | Paul et al. | |
| 8,887,238 B2 | 11/2014 | Howard et al. | |
| 8,887,285 B2 | 11/2014 | Jordan et al. | |
| 8,904,520 B1 | 12/2014 | Nachenberg et al. | |
| 8,908,685 B2 | 12/2014 | Patel et al. | |
| 8,914,497 B1 | 12/2014 | Xiao et al. | |
| 8,924,941 B2 | 12/2014 | Krajec et al. | |
| 8,931,043 B2 | 1/2015 | Cooper et al. | |
| 8,954,546 B2 | 2/2015 | Krajec | |
| 8,954,610 B2 | 2/2015 | Berke et al. | |
| 8,955,124 B2 | 2/2015 | Kim et al. | |
| 8,966,021 B1 | 2/2015 | Allen | |
| 8,966,625 B1 | 2/2015 | Zuk et al. | |
| 8,973,147 B2 | 3/2015 | Pearcy et al. | |
| 8,984,331 B2 | 3/2015 | Quinn | |
| 8,990,386 B2 | 3/2015 | He et al. | |
| 8,996,695 B2 | 3/2015 | Anderson et al. | |
| 8,997,063 B2 | 3/2015 | Krajec et al. | |
| 8,997,227 B1 | 3/2015 | Mhatre et al. | |
| 9,014,047 B2 | 4/2015 | Alcala et al. | |
| 9,015,716 B2 | 4/2015 | Fletcher et al. | |
| 9,043,905 B1 | 5/2015 | Allen et al. | |
| 9,071,575 B2 | 6/2015 | Lemaster et al. | |
| 9,088,598 B1 | 7/2015 | Zhang et al. | |
| 9,104,543 B1 | 8/2015 | Cavanagh et al. | |
| 9,110,905 B2 | 8/2015 | Polley et al. | |
| 9,117,075 B1 | 8/2015 | Yeh | |
| 9,122,599 B1 | 9/2015 | Jaladanki et al. | |
| 9,130,836 B2 | 9/2015 | Kapadia et al. | |
| 9,135,145 B2 | 9/2015 | Voccio et al. | |
| 9,141,912 B2 | 9/2015 | Shircliff et al. | |
| 9,141,914 B2 | 9/2015 | Viswanathan et al. | |
| 9,146,820 B2 | 9/2015 | Alfadhly et al. | |

(56) References Cited

U.S. PATENT DOCUMENTS

| | | | |
|---|---|---|---|
| 9,152,789 B2 | 10/2015 | Natarajan et al. |
| 9,158,720 B2 | 10/2015 | Shirlen et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,179,058 B1 | 11/2015 | Zeira et al. |
| 9,185,127 B2 | 11/2015 | Neou et al. |
| 9,191,042 B2 | 11/2015 | Dhayni |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,252,915 B1 | 2/2016 | Bakken |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,276,829 B2 | 3/2016 | Castro et al. |
| 9,281,940 B2 | 3/2016 | Matsuda et al. |
| 9,286,047 B1 | 3/2016 | Avramov et al. |
| 9,292,415 B2 | 3/2016 | Seto et al. |
| 9,294,486 B1 | 3/2016 | Chiang et al. |
| 9,294,498 B1 | 3/2016 | Yampolskiy et al. |
| 9,300,689 B2 | 3/2016 | Tsuchitoi |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,385,917 B1 | 7/2016 | Khanna et al. |
| 9,396,327 B2 | 7/2016 | Auger et al. |
| 9,397,902 B2 | 7/2016 | Dragon et al. |
| 9,405,903 B1 | 8/2016 | Xie et al. |
| 9,413,615 B1 | 8/2016 | Singh et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,483,334 B2 | 11/2016 | Walsh |
| 9,487,222 B2 | 11/2016 | Palmer et al. |
| 9,501,744 B1 | 11/2016 | Brisebois et al. |
| 9,531,589 B2 | 12/2016 | Clemm et al. |
| 9,536,084 B1 | 1/2017 | Lukacs et al. |
| 9,552,221 B1 | 1/2017 | Pora |
| 9,563,517 B1 | 2/2017 | Natanzon et al. |
| 9,575,869 B2 | 2/2017 | Pechanec et al. |
| 9,575,874 B2 | 2/2017 | Gautallin et al. |
| 9,576,240 B2 | 2/2017 | Jeong et al. |
| 9,582,669 B1 | 2/2017 | Shen et al. |
| 9,596,196 B1 | 3/2017 | Hills |
| 9,602,536 B1 | 3/2017 | Brown, Jr. et al. |
| 9,621,413 B1 | 4/2017 | Lee |
| 9,621,575 B1 | 4/2017 | Jalan et al. |
| 9,634,915 B2 | 4/2017 | Bley |
| 9,645,892 B1 | 5/2017 | Patwardhan |
| 9,658,942 B2 | 5/2017 | Bhat et al. |
| 9,665,474 B2 | 5/2017 | Li et al. |
| 9,678,803 B2 | 6/2017 | Suit |
| 9,684,453 B2 | 6/2017 | Holt et al. |
| 9,686,233 B2 | 6/2017 | Paxton |
| 9,697,033 B2 | 7/2017 | Koponen et al. |
| 9,727,394 B2 | 8/2017 | Kun et al. |
| 9,729,568 B2 | 8/2017 | Lefebvre et al. |
| 9,733,973 B2 | 8/2017 | Prasad et al. |
| 9,734,712 B1 | 8/2017 | Lai |
| 9,736,041 B2 | 8/2017 | Lumezanu et al. |
| 9,749,145 B2 | 8/2017 | Banavalikar et al. |
| 9,753,796 B2 | 9/2017 | Mahaffey et al. |
| 9,800,608 B2 | 10/2017 | Korsunsky et al. |
| 9,804,830 B2 | 10/2017 | Raman et al. |
| 9,804,951 B2 | 10/2017 | Liu et al. |
| 9,813,307 B2 | 11/2017 | Walsh et al. |
| 9,813,324 B2 | 11/2017 | Nampelly et al. |
| 9,813,516 B2 | 11/2017 | Wang |
| 9,825,911 B1 | 11/2017 | Brandwine |
| 9,836,183 B1 | 12/2017 | Love et al. |
| 9,857,825 B1 | 1/2018 | Johnson et al. |
| 9,858,621 B1 | 1/2018 | Konrardy et al. |
| 9,860,208 B1 | 1/2018 | Ettema et al. |
| 9,904,584 B2 | 2/2018 | Konig et al. |
| 9,916,232 B2 | 3/2018 | Voccio et al. |
| 9,916,538 B2 | 3/2018 | Zadeh et al. |
| 9,935,851 B2 | 4/2018 | Gandham et al. |
| 9,967,158 B2 | 5/2018 | Pang et al. |
| 9,979,615 B2 | 5/2018 | Kulshreshtha et al. |
| 9,996,529 B2 | 6/2018 | McCandless et al. |
| 10,002,187 B2 | 6/2018 | McCandless et al. |
| 10,009,240 B2 | 6/2018 | Rao et al. |
| 10,116,531 B2 | 10/2018 | Alizadeh Attar et al. |
| 10,142,353 B2 | 11/2018 | Yadav et al. |
| 10,171,319 B2 | 1/2019 | Yadav et al. |
| 10,243,862 B2 | 3/2019 | Cafarelli et al. |
| 10,394,692 B2 | 8/2019 | Liu et al. |
| 10,447,551 B1 | 10/2019 | Zhang et al. |
| 10,454,793 B2 | 10/2019 | Deen et al. |
| 10,454,999 B2 | 10/2019 | Eder |
| 10,476,982 B2 | 11/2019 | Tarre et al. |
| 10,516,586 B2 | 12/2019 | Gandham et al. |
| 10,652,225 B2 | 5/2020 | Koved et al. |
| 10,686,804 B2 | 6/2020 | Yadav et al. |
| 10,749,890 B1 | 8/2020 | Aloisio et al. |
| 10,944,683 B1 | 3/2021 | Roskind |
| 11,368,378 B2 | 6/2022 | Gandham et al. |
| 11,516,098 B2 | 11/2022 | Spadaro et al. |
| 11,528,283 B2 | 12/2022 | Yadav et al. |
| 11,556,808 B1 | 1/2023 | Kim et al. |
| 2001/0028646 A1 | 10/2001 | Arts et al. |
| 2002/0023210 A1 | 2/2002 | Tuomenoksa et al. |
| 2002/0053033 A1 | 5/2002 | Cooper et al. |
| 2002/0083175 A1 | 6/2002 | Afek et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0107875 A1 | 8/2002 | Seliger et al. |
| 2002/0141343 A1 | 10/2002 | Bays |
| 2002/0169739 A1 | 11/2002 | Carr et al. |
| 2002/0184393 A1 | 12/2002 | Leddy et al. |
| 2002/0196292 A1 | 12/2002 | Itoh et al. |
| 2003/0005145 A1 | 1/2003 | Bullard |
| 2003/0016627 A1* | 1/2003 | MeLampy ........ H04L 29/06027 |
| | | 370/235 |
| 2003/0023600 A1 | 1/2003 | Nagamura et al. |
| 2003/0023601 A1 | 1/2003 | Fortier, Jr. et al. |
| 2003/0035140 A1 | 2/2003 | Tomita et al. |
| 2003/0046388 A1 | 3/2003 | Milliken |
| 2003/0065986 A1 | 4/2003 | Fraenkel et al. |
| 2003/0069953 A1 | 4/2003 | Bottom et al. |
| 2003/0072269 A1* | 4/2003 | Teruhi ..................... H04L 45/02 |
| | | 370/252 |
| 2003/0084158 A1 | 5/2003 | Saito et al. |
| 2003/0086425 A1 | 5/2003 | Bearden et al. |
| 2003/0097439 A1 | 5/2003 | Strayer et al. |
| 2003/0105976 A1 | 6/2003 | Copeland, III |
| 2003/0126242 A1 | 7/2003 | Chang |
| 2003/0133443 A1 | 7/2003 | Klinker et al. |
| 2003/0145232 A1 | 7/2003 | Poletto et al. |
| 2003/0149888 A1 | 8/2003 | Yadav |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2003/0206205 A1 | 11/2003 | Kawahara et al. |
| 2004/0019676 A1 | 1/2004 | Iwatsuki et al. |
| 2004/0030776 A1 | 2/2004 | Cantrell et al. |
| 2004/0036478 A1 | 2/2004 | Logvinov et al. |
| 2004/0046787 A1 | 3/2004 | Henry et al. |
| 2004/0049698 A1 | 3/2004 | Ott et al. |
| 2004/0054680 A1 | 3/2004 | Kelley et al. |
| 2004/0111679 A1 | 6/2004 | Subasic et al. |
| 2004/0133640 A1 | 7/2004 | Yeager et al. |
| 2004/0133690 A1 | 7/2004 | Chauffour et al. |

(56) References Cited

U.S. PATENT DOCUMENTS

| | | |
|---|---|---|
| 2004/0137908 A1 | 7/2004 | Sinivaara et al. |
| 2004/0167921 A1 | 8/2004 | Carson et al. |
| 2004/0205536 A1 | 10/2004 | Newman et al. |
| 2004/0213221 A1 | 10/2004 | Civanlar et al. |
| 2004/0218532 A1 | 11/2004 | Khirman |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0060403 A1 | 3/2005 | Bernstein et al. |
| 2005/0063377 A1 | 3/2005 | Bryant et al. |
| 2005/0068907 A1 | 3/2005 | Garg et al. |
| 2005/0083933 A1 | 4/2005 | Fine et al. |
| 2005/0104885 A1 | 5/2005 | Jager et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0154625 A1 | 7/2005 | Chua et al. |
| 2005/0166066 A1 | 7/2005 | Ahuja et al. |
| 2005/0177829 A1 | 8/2005 | Vishwanath |
| 2005/0177871 A1 | 8/2005 | Roesch et al. |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0210331 A1 | 9/2005 | Connelly et al. |
| 2005/0210533 A1 | 9/2005 | Copeland et al. |
| 2005/0228885 A1 | 10/2005 | Winfield et al. |
| 2005/0237948 A1 | 10/2005 | Wan et al. |
| 2005/0257244 A1 | 11/2005 | Joly et al. |
| 2005/0289244 A1 | 12/2005 | Sahu et al. |
| 2006/0004758 A1 | 1/2006 | Teng et al. |
| 2006/0026669 A1 | 2/2006 | Zakas |
| 2006/0048218 A1 | 3/2006 | Lingafelt et al. |
| 2006/0058218 A1 | 3/2006 | Syud et al. |
| 2006/0075396 A1 | 4/2006 | Surasinghe |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0098625 A1 | 5/2006 | King et al. |
| 2006/0101516 A1 | 5/2006 | Sudaharan et al. |
| 2006/0106550 A1 | 5/2006 | Morin et al. |
| 2006/0143432 A1 | 6/2006 | Rothman et al. |
| 2006/0156408 A1 | 7/2006 | Himberger et al. |
| 2006/0158266 A1 | 7/2006 | Yonekawa et al. |
| 2006/0158354 A1 | 7/2006 | Aberg et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0212556 A1 | 9/2006 | Yacoby et al. |
| 2006/0224398 A1 | 10/2006 | Lakshman et al. |
| 2006/0253566 A1 | 11/2006 | Stassinopoulos et al. |
| 2006/0265713 A1 | 11/2006 | Depro et al. |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0010898 A1 | 1/2007 | Hosek et al. |
| 2007/0014275 A1 | 1/2007 | Bettink et al. |
| 2007/0019618 A1 | 1/2007 | Shaffer et al. |
| 2007/0025306 A1 | 2/2007 | Cox et al. |
| 2007/0044147 A1 | 2/2007 | Choi et al. |
| 2007/0067756 A1 | 3/2007 | Garza |
| 2007/0074288 A1 | 3/2007 | Chang et al. |
| 2007/0097976 A1 | 5/2007 | Wood et al. |
| 2007/0118654 A1 | 5/2007 | Jamkhedkar et al. |
| 2007/0124376 A1 | 5/2007 | Greenwell |
| 2007/0127491 A1 | 6/2007 | Verzijp et al. |
| 2007/0140131 A1 | 6/2007 | Malloy et al. |
| 2007/0150568 A1 | 6/2007 | Ruiz |
| 2007/0162420 A1 | 7/2007 | Ou et al. |
| 2007/0169179 A1 | 7/2007 | Narad |
| 2007/0177626 A1 | 8/2007 | Kotelba |
| 2007/0180526 A1 | 8/2007 | Copeland |
| 2007/0195729 A1 | 8/2007 | Li et al. |
| 2007/0195794 A1 | 8/2007 | Fujita et al. |
| 2007/0195797 A1* | 8/2007 | Patel .................... H04J 3/0685 |
| | | 370/400 |
| 2007/0199060 A1 | 8/2007 | Touboul |
| 2007/0201474 A1 | 8/2007 | Isobe |
| 2007/0209074 A1 | 9/2007 | Coffman |
| 2007/0211637 A1 | 9/2007 | Mitchell |
| 2007/0214348 A1 | 9/2007 | Danielsen |
| 2007/0220159 A1 | 9/2007 | Choi et al. |
| 2007/0223388 A1* | 9/2007 | Arad ........................ H04L 1/24 |
| | | 370/252 |
| 2007/0230415 A1 | 10/2007 | Malik |
| 2007/0232265 A1 | 10/2007 | Park et al. |
| 2007/0250640 A1 | 10/2007 | Wells |
| 2007/0250930 A1 | 10/2007 | Aziz et al. |
| 2007/0280108 A1 | 12/2007 | Sakurai |
| 2007/0300061 A1 | 12/2007 | Kim et al. |
| 2008/0002697 A1 | 1/2008 | Anantharamaiah et al. |
| 2008/0013532 A1 | 1/2008 | Garner et al. |
| 2008/0017619 A1 | 1/2008 | Yamakawa et al. |
| 2008/0022385 A1 | 1/2008 | Crowell et al. |
| 2008/0028389 A1 | 1/2008 | Genty et al. |
| 2008/0040088 A1 | 2/2008 | Vankov et al. |
| 2008/0046708 A1 | 2/2008 | Fitzgerald et al. |
| 2008/0049633 A1* | 2/2008 | Edwards ............. H04L 43/0852 |
| | | 370/252 |
| 2008/0052387 A1 | 2/2008 | Heinz et al. |
| 2008/0056124 A1 | 3/2008 | Nanda et al. |
| 2008/0066009 A1 | 3/2008 | Gardner et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0181100 A1 | 7/2008 | Yang et al. |
| 2008/0185621 A1 | 8/2008 | Yi et al. |
| 2008/0201109 A1 | 8/2008 | Zill et al. |
| 2008/0208367 A1 | 8/2008 | Koehler et al. |
| 2008/0222352 A1 | 9/2008 | Booth et al. |
| 2008/0232358 A1 | 9/2008 | Baker et al. |
| 2008/0247539 A1 | 10/2008 | Huang et al. |
| 2008/0250122 A1 | 10/2008 | Zsigmond et al. |
| 2008/0250128 A1 | 10/2008 | Sargent |
| 2008/0262990 A1 | 10/2008 | Kapoor et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0298271 A1 | 12/2008 | Morinaga et al. |
| 2008/0300834 A1 | 12/2008 | Wiemer et al. |
| 2008/0301755 A1 | 12/2008 | Sinha et al. |
| 2008/0301765 A1 | 12/2008 | Nicol et al. |
| 2008/0320592 A1 | 12/2008 | Suit et al. |
| 2009/0019026 A1 | 1/2009 | Valdes-Perez et al. |
| 2009/0059934 A1 | 3/2009 | Aggarwal et al. |
| 2009/0064332 A1 | 3/2009 | Porras et al. |
| 2009/0077097 A1 | 3/2009 | Lacapra et al. |
| 2009/0077543 A1 | 3/2009 | Siskind et al. |
| 2009/0077666 A1 | 3/2009 | Chen et al. |
| 2009/0106646 A1 | 4/2009 | Mollicone et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0158432 A1 | 6/2009 | Zheng et al. |
| 2009/0161658 A1 | 6/2009 | Danner et al. |
| 2009/0164565 A1 | 6/2009 | Underhill |
| 2009/0177484 A1 | 7/2009 | Davis et al. |
| 2009/0180393 A1 | 7/2009 | Nakamura |
| 2009/0192847 A1 | 7/2009 | Lipkin et al. |
| 2009/0193495 A1 | 7/2009 | McAfee et al. |
| 2009/0241170 A1 | 9/2009 | Kumar et al. |
| 2009/0249302 A1 | 10/2009 | Xu et al. |
| 2009/0252181 A1 | 10/2009 | Desanti |
| 2009/0260083 A1 | 10/2009 | Szeto et al. |

(56) References Cited

U.S. PATENT DOCUMENTS

| | | |
|---|---|---|
| 2009/0271412 A1 | 10/2009 | Lacapra et al. |
| 2009/0271504 A1 | 10/2009 | Ginter et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0310485 A1 | 12/2009 | Averi et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0005478 A1 | 1/2010 | Helfman et al. |
| 2010/0042716 A1 | 2/2010 | Farajidana et al. |
| 2010/0049839 A1 | 2/2010 | Parker et al. |
| 2010/0054241 A1 | 3/2010 | Shah et al. |
| 2010/0070647 A1 | 3/2010 | Rino et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0128598 A1 | 5/2010 | Gandhewar et al. |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0157809 A1 | 6/2010 | Duffield et al. |
| 2010/0161817 A1 | 6/2010 | Xiao et al. |
| 2010/0174813 A1 | 7/2010 | Hildreth et al. |
| 2010/0180016 A1 | 7/2010 | Bugwadia et al. |
| 2010/0185901 A1 | 7/2010 | Hirsch |
| 2010/0188989 A1* | 7/2010 | Wing .................... H04L 43/065 |
| | | 370/252 |
| 2010/0188995 A1 | 7/2010 | Raleigh |
| 2010/0194741 A1 | 8/2010 | Finocchio |
| 2010/0220584 A1 | 9/2010 | DeHaan et al. |
| 2010/0226373 A1 | 9/2010 | Rowell et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0246432 A1 | 9/2010 | Zhang et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055382 A1 | 3/2011 | Narasimhan |
| 2011/0055388 A1 | 3/2011 | Yumnerefendi et al. |
| 2011/0060704 A1 | 3/2011 | Rubin et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083124 A1 | 4/2011 | Moskal et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0125894 A1 | 5/2011 | Anderson et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0158112 A1 | 6/2011 | Finn et al. |
| 2011/0158410 A1 | 6/2011 | Falk et al. |
| 2011/0167435 A1 | 7/2011 | Fang |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0191465 A1 | 8/2011 | Hofstaedter et al. |
| 2011/0196957 A1 | 8/2011 | Ayachitula et al. |
| 2011/0202655 A1 | 8/2011 | Sharma et al. |
| 2011/0202761 A1 | 8/2011 | Sarela et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0231510 A1 | 9/2011 | Korsunsky et al. |
| 2011/0238793 A1 | 9/2011 | Bedare et al. |
| 2011/0239058 A1 | 9/2011 | Umezuki |
| 2011/0239194 A1 | 9/2011 | Braude |
| 2011/0246663 A1 | 10/2011 | Melsen et al. |
| 2011/0267952 A1 | 11/2011 | Ko et al. |
| 2011/0276951 A1 | 11/2011 | Jain |
| 2011/0277034 A1 | 11/2011 | Hanson |
| 2011/0283266 A1 | 11/2011 | Gallagher et al. |
| 2011/0283277 A1 | 11/2011 | Castillo et al. |
| 2011/0289122 A1 | 11/2011 | Grube et al. |
| 2011/0289301 A1 | 11/2011 | Allen et al. |
| 2011/0302295 A1 | 12/2011 | Westerfeld et al. |
| 2011/0302652 A1 | 12/2011 | Westerfeld |
| 2011/0310892 A1 | 12/2011 | DiMambro |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0011153 A1 | 1/2012 | Buchanan et al. |
| 2012/0016972 A1 | 1/2012 | Tamura |
| 2012/0017262 A1 | 1/2012 | Kapoor et al. |
| 2012/0047394 A1 | 2/2012 | Jain et al. |
| 2012/0075999 A1 | 3/2012 | Ko et al. |
| 2012/0079592 A1 | 3/2012 | Pandrangi |
| 2012/0089664 A1 | 4/2012 | Igelka |
| 2012/0096394 A1 | 4/2012 | Balko et al. |
| 2012/0102361 A1 | 4/2012 | Sass et al. |
| 2012/0102543 A1 | 4/2012 | Kohli et al. |
| 2012/0102545 A1 | 4/2012 | Carter, III et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0144030 A1 | 6/2012 | Narasimhan |
| 2012/0167057 A1 | 6/2012 | Schmich et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0216282 A1 | 8/2012 | Pappu et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240185 A1 | 9/2012 | Kapoor et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0255875 A1 | 10/2012 | Vicente et al. |
| 2012/0260135 A1 | 10/2012 | Beck et al. |
| 2012/0260227 A1 | 10/2012 | Shukla et al. |
| 2012/0260236 A1 | 10/2012 | Basak et al. |
| 2012/0268405 A1 | 10/2012 | Ferren et al. |
| 2012/0278021 A1 | 11/2012 | Lin et al. |
| 2012/0281700 A1 | 11/2012 | Koganti et al. |
| 2012/0287815 A1 | 11/2012 | Attar |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0019008 A1 | 1/2013 | Jorgenson et al. |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0055145 A1 | 2/2013 | Antony et al. |
| 2013/0055373 A1 | 2/2013 | Beacham et al. |

(56) References Cited

U.S. PATENT DOCUMENTS

| | | |
|---|---|---|
| 2013/0064096 A1 | 3/2013 | Degioanni et al. |
| 2013/0080375 A1 | 3/2013 | Viswanathan et al. |
| 2013/0085889 A1 | 4/2013 | Fitting et al. |
| 2013/0086272 A1 | 4/2013 | Chen et al. |
| 2013/0094372 A1 | 4/2013 | Boot |
| 2013/0094376 A1 | 4/2013 | Reeves |
| 2013/0097706 A1 | 4/2013 | Titonis et al. |
| 2013/0103827 A1 | 4/2013 | Dunlap et al. |
| 2013/0107709 A1 | 5/2013 | Campbell et al. |
| 2013/0114598 A1 | 5/2013 | Schrum et al. |
| 2013/0117748 A1 | 5/2013 | Cooper et al. |
| 2013/0117847 A1 | 5/2013 | Friedman et al. |
| 2013/0122854 A1 | 5/2013 | Agarwal et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0160128 A1 | 6/2013 | Dolan-Gavitt et al. |
| 2013/0166730 A1 | 6/2013 | Wilkinson |
| 2013/0173784 A1 | 7/2013 | Wang et al. |
| 2013/0173787 A1 | 7/2013 | Tateishi et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198509 A1 | 8/2013 | Buruganahalli et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205137 A1 | 8/2013 | Farrugia et al. |
| 2013/0205293 A1 | 8/2013 | Levijarvi et al. |
| 2013/0219161 A1 | 8/2013 | Fontignie et al. |
| 2013/0219263 A1 | 8/2013 | Abrahami |
| 2013/0219500 A1 | 8/2013 | Lukas et al. |
| 2013/0232498 A1 | 9/2013 | Mangtani et al. |
| 2013/0238665 A1 | 9/2013 | Sequin |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283240 A1 | 10/2013 | Krajec et al. |
| 2013/0283281 A1 | 10/2013 | Krajec et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0298244 A1 | 11/2013 | Kumar et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0308468 A1 | 11/2013 | Cowie |
| 2013/0312097 A1 | 11/2013 | Turnbull |
| 2013/0318357 A1 | 11/2013 | Abraham et al. |
| 2013/0322441 A1 | 12/2013 | Anumala |
| 2013/0326623 A1 | 12/2013 | Kruglick |
| 2013/0326625 A1 | 12/2013 | Anderson et al. |
| 2013/0332773 A1 | 12/2013 | Yuan et al. |
| 2013/0333029 A1 | 12/2013 | Chesla et al. |
| 2013/0335219 A1 | 12/2013 | Malkowski |
| 2013/0336164 A1 | 12/2013 | Yang et al. |
| 2013/0343207 A1 | 12/2013 | Cook et al. |
| 2013/0346054 A1 | 12/2013 | Mumtaz |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0009338 A1 | 1/2014 | Lin et al. |
| 2014/0012562 A1 | 1/2014 | Chang et al. |
| 2014/0012814 A1 | 1/2014 | Bercovici et al. |
| 2014/0019972 A1 | 1/2014 | Yahalom et al. |
| 2014/0020099 A1 | 1/2014 | Vaidyanathan et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047274 A1 | 2/2014 | Lumezanu et al. |
| 2014/0047372 A1 | 2/2014 | Gnezdov et al. |
| 2014/0050222 A1 | 2/2014 | Lynar et al. |
| 2014/0053226 A1 | 2/2014 | Fadida et al. |
| 2014/0056318 A1* | 2/2014 | Hansson .............. H04J 3/0667 370/503 |
| 2014/0059200 A1 | 2/2014 | Nguyen et al. |
| 2014/0074946 A1 | 3/2014 | Dirstine et al. |
| 2014/0075048 A1 | 3/2014 | Yuksel et al. |
| 2014/0075336 A1 | 3/2014 | Curtis et al. |
| 2014/0081596 A1 | 3/2014 | Agrawal et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0108665 A1 | 4/2014 | Arora et al. |
| 2014/0115219 A1 | 4/2014 | Ajanovic et al. |
| 2014/0115403 A1 | 4/2014 | Rhee et al. |
| 2014/0115654 A1 | 4/2014 | Rogers et al. |
| 2014/0122656 A1 | 5/2014 | Baldwin et al. |
| 2014/0129942 A1 | 5/2014 | Rathod |
| 2014/0130039 A1 | 5/2014 | Chaplik et al. |
| 2014/0136680 A1 | 5/2014 | Joshi et al. |
| 2014/0137109 A1 | 5/2014 | Sharma et al. |
| 2014/0137180 A1 | 5/2014 | Lukacs et al. |
| 2014/0140213 A1 | 5/2014 | Raleigh et al. |
| 2014/0140244 A1 | 5/2014 | Kapadia et al. |
| 2014/0141524 A1 | 5/2014 | Keith |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0173723 A1 | 6/2014 | Singla et al. |
| 2014/0192639 A1 | 7/2014 | Smirnov |
| 2014/0201717 A1 | 7/2014 | Mascaro et al. |
| 2014/0201838 A1 | 7/2014 | Varsanyi et al. |
| 2014/0208296 A1 | 7/2014 | Dang et al. |
| 2014/0210616 A1 | 7/2014 | Ramachandran |
| 2014/0215443 A1 | 7/2014 | Voccio et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0230062 A1 | 8/2014 | Kumaran |
| 2014/0233387 A1 | 8/2014 | Zheng et al. |
| 2014/0247206 A1 | 9/2014 | Grokop et al. |
| 2014/0258310 A1 | 9/2014 | Wong et al. |
| 2014/0269777 A1 | 9/2014 | Rothstein et al. |
| 2014/0280499 A1 | 9/2014 | Basavaiah et al. |
| 2014/0280892 A1 | 9/2014 | Reynolds et al. |
| 2014/0280908 A1 | 9/2014 | Rothstein et al. |
| 2014/0281030 A1 | 9/2014 | Cui et al. |
| 2014/0286174 A1 | 9/2014 | Lizuka et al. |
| 2014/0286354 A1 | 9/2014 | Van De Poel et al. |
| 2014/0289418 A1 | 9/2014 | Cohen et al. |
| 2014/0289854 A1 | 9/2014 | Mahvi |
| 2014/0297357 A1 | 10/2014 | Zeng et al. |
| 2014/0298461 A1 | 10/2014 | Hohndel et al. |
| 2014/0301213 A1 | 10/2014 | Khanal et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0321290 A1 | 10/2014 | Jin et al. |
| 2014/0330616 A1 | 11/2014 | Lyras |
| 2014/0331048 A1* | 11/2014 | Casas-Sanchez ... H04L 43/0858 713/168 |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0344438 A1 | 11/2014 | Chen et al. |
| 2014/0348182 A1* | 11/2014 | Chandra .............. H04J 3/0697 370/503 |
| 2014/0351203 A1 | 11/2014 | Kunnatur et al. |

(56) References Cited

U.S. PATENT DOCUMENTS

| | | |
|---|---|---|
| 2014/0351415 A1 | 11/2014 | Harrigan et al. |
| 2014/0359695 A1 | 12/2014 | Chari et al. |
| 2014/0363076 A1 | 12/2014 | Han et al. |
| 2014/0376379 A1* | 12/2014 | Fredette ................. G06F 15/167 |
| | | 370/236 |
| 2015/0006689 A1 | 1/2015 | Szilagyi et al. |
| 2015/0006714 A1 | 1/2015 | Jain |
| 2015/0007317 A1 | 1/2015 | Jain |
| 2015/0009840 A1 | 1/2015 | Pruthi et al. |
| 2015/0019140 A1 | 1/2015 | Downey et al. |
| 2015/0019569 A1 | 1/2015 | Parker et al. |
| 2015/0023170 A1 | 1/2015 | Kakadia et al. |
| 2015/0026794 A1 | 1/2015 | Zuk et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0039757 A1 | 2/2015 | Petersen et al. |
| 2015/0043351 A1 | 2/2015 | Ohkawa et al. |
| 2015/0046882 A1 | 2/2015 | Menyhart et al. |
| 2015/0047032 A1 | 2/2015 | Hannis et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0089614 A1 | 3/2015 | Mathew et al. |
| 2015/0095332 A1 | 4/2015 | Beisiegel et al. |
| 2015/0099956 A1 | 4/2015 | Emken et al. |
| 2015/0112933 A1 | 4/2015 | Satapathy |
| 2015/0113063 A1 | 4/2015 | Liu et al. |
| 2015/0113133 A1 | 4/2015 | Srinivas et al. |
| 2015/0117624 A1 | 4/2015 | Rosenshine |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0128246 A1 | 5/2015 | Feghali et al. |
| 2015/0134801 A1 | 5/2015 | Walley et al. |
| 2015/0138993 A1 | 5/2015 | Forster et al. |
| 2015/0142962 A1 | 5/2015 | Srinivas et al. |
| 2015/0147973 A1 | 5/2015 | Williams et al. |
| 2015/0156118 A1 | 6/2015 | Madani et al. |
| 2015/0170213 A1 | 6/2015 | O'Malley |
| 2015/0195291 A1 | 7/2015 | Zuk et al. |
| 2015/0199254 A1 | 7/2015 | Vesepogu et al. |
| 2015/0215334 A1 | 7/2015 | Bingham et al. |
| 2015/0222516 A1 | 8/2015 | Deval et al. |
| 2015/0222939 A1 | 8/2015 | Gallant et al. |
| 2015/0227396 A1 | 8/2015 | Nimmagadda et al. |
| 2015/0227598 A1 | 8/2015 | Hahn et al. |
| 2015/0244617 A1 | 8/2015 | Nakil et al. |
| 2015/0244739 A1 | 8/2015 | Ben-Shalom et al. |
| 2015/0245248 A1 | 8/2015 | Shudark et al. |
| 2015/0249622 A1 | 9/2015 | Phillips et al. |
| 2015/0254330 A1 | 9/2015 | Chan et al. |
| 2015/0256413 A1 | 9/2015 | Du et al. |
| 2015/0256555 A1 | 9/2015 | Choi et al. |
| 2015/0256587 A1* | 9/2015 | Walker .................. G06F 16/639 |
| | | 709/203 |
| 2015/0261842 A1 | 9/2015 | Huang et al. |
| 2015/0261886 A1 | 9/2015 | Wu et al. |
| 2015/0261887 A1 | 9/2015 | Joukov |
| 2015/0271008 A1 | 9/2015 | Jain et al. |
| 2015/0271255 A1 | 9/2015 | Mackay et al. |
| 2015/0278273 A1 | 10/2015 | Wigington et al. |
| 2015/0281116 A1 | 10/2015 | Ko et al. |
| 2015/0281277 A1 | 10/2015 | May et al. |
| 2015/0281407 A1 | 10/2015 | Raju et al. |
| 2015/0294212 A1 | 10/2015 | Fein |
| 2015/0295945 A1 | 10/2015 | Canzanese, Jr. et al. |
| 2015/0304346 A1 | 10/2015 | Kim |

| | | |
|---|---|---|
| 2015/0312233 A1 | 10/2015 | Graham, III et al. |
| 2015/0336016 A1 | 11/2015 | Chaturvedi |
| 2015/0341376 A1 | 11/2015 | Nandy et al. |
| 2015/0341379 A1 | 11/2015 | Lefebvre et al. |
| 2015/0341383 A1 | 11/2015 | Reddy et al. |
| 2015/0347554 A1 | 12/2015 | Vasantham et al. |
| 2015/0356297 A1 | 12/2015 | Guri et al. |
| 2015/0358287 A1 | 12/2015 | Caputo et al. |
| 2015/0358352 A1 | 12/2015 | Chasin et al. |
| 2015/0379278 A1 | 12/2015 | Thota et al. |
| 2015/0381409 A1 | 12/2015 | Margalit et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0028605 A1 | 1/2016 | Gil et al. |
| 2016/0030683 A1 | 2/2016 | Taylor et al. |
| 2016/0034560 A1 | 2/2016 | Setayesh et al. |
| 2016/0035787 A1 | 2/2016 | Matsuda |
| 2016/0036636 A1 | 2/2016 | Erickson et al. |
| 2016/0036833 A1 | 2/2016 | Ardeli et al. |
| 2016/0036837 A1 | 2/2016 | Jain et al. |
| 2016/0036838 A1 | 2/2016 | Jain et al. |
| 2016/0050128 A1 | 2/2016 | Schaible et al. |
| 2016/0050132 A1 | 2/2016 | Zhang et al. |
| 2016/0072638 A1 | 3/2016 | Amer et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0094657 A1 | 3/2016 | Vieira et al. |
| 2016/0094994 A1 | 3/2016 | Kirkby et al. |
| 2016/0103692 A1 | 4/2016 | Guntaka et al. |
| 2016/0105333 A1 | 4/2016 | Lenglet et al. |
| 2016/0105350 A1 | 4/2016 | Greifeneder et al. |
| 2016/0112269 A1 | 4/2016 | Singh et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0148251 A1 | 5/2016 | Thomas et al. |
| 2016/0150060 A1 | 5/2016 | Meng et al. |
| 2016/0156531 A1 | 6/2016 | Cartwright et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191362 A1 | 6/2016 | Hwang et al. |
| 2016/0191466 A1 | 6/2016 | Pernicha |
| 2016/0191469 A1 | 6/2016 | Zatko et al. |
| 2016/0191476 A1 | 6/2016 | Schutz et al. |
| 2016/0196374 A1 | 7/2016 | Bar et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0218933 A1 | 7/2016 | Porras et al. |
| 2016/0234083 A1 | 8/2016 | Ahn et al. |
| 2016/0248794 A1 | 8/2016 | Cam |
| 2016/0248813 A1 | 8/2016 | Byrnes |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0277272 A1* | 9/2016 | Peach ................... H04L 43/106 |
| 2016/0277435 A1 | 9/2016 | Salajegheh et al. |
| 2016/0283307 A1 | 9/2016 | Takeshima et al. |
| 2016/0285730 A1 | 9/2016 | Ohkawa et al. |
| 2016/0292065 A1 | 10/2016 | Thangamani et al. |
| 2016/0294691 A1 | 10/2016 | Joshi |
| 2016/0306550 A1 | 10/2016 | Liu et al. |
| 2016/0308908 A1 | 10/2016 | Kirby et al. |
| 2016/0321452 A1 | 11/2016 | Richardson et al. |
| 2016/0321455 A1 | 11/2016 | Deng et al. |
| 2016/0330097 A1 | 11/2016 | Kim et al. |
| 2016/0337204 A1 | 11/2016 | Dubey et al. |

(56) References Cited

U.S. PATENT DOCUMENTS

| 2016/0357424 A1 | 12/2016 | Pang et al. |
|---|---|---|
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0378978 A1 | 12/2016 | Singla et al. |
| 2016/0380865 A1 | 12/2016 | Dubai et al. |
| 2016/0380869 A1 | 12/2016 | Shen et al. |
| 2017/0006141 A1 | 1/2017 | Bhadra |
| 2017/0024453 A1 | 1/2017 | Raja et al. |
| 2017/0032122 A1 | 2/2017 | Thakar et al. |
| 2017/0032310 A1 | 2/2017 | Mimnaugh |
| 2017/0034018 A1 | 2/2017 | Parasdehgheibi et al. |
| 2017/0048121 A1 | 2/2017 | Hobbs et al. |
| 2017/0054643 A1 | 2/2017 | Fraser |
| 2017/0059353 A1 | 3/2017 | Madine et al. |
| 2017/0070582 A1 | 3/2017 | Desai et al. |
| 2017/0075710 A1 | 3/2017 | Prasad et al. |
| 2017/0085483 A1 | 3/2017 | Mihaly et al. |
| 2017/0091204 A1 | 3/2017 | Minwalla et al. |
| 2017/0093910 A1 | 3/2017 | Gukal et al. |
| 2017/0118244 A1 | 4/2017 | Bai et al. |
| 2017/0163502 A1 | 6/2017 | Macneil et al. |
| 2017/0187733 A1 | 6/2017 | Ahn et al. |
| 2017/0201448 A1 | 7/2017 | Deval et al. |
| 2017/0208487 A1 | 7/2017 | Ratakonda et al. |
| 2017/0214708 A1 | 7/2017 | Gukal et al. |
| 2017/0222909 A1* | 8/2017 | Sadana ................ H04L 43/106 |
| 2017/0223052 A1 | 8/2017 | Stutz |
| 2017/0250880 A1 | 8/2017 | Akens et al. |
| 2017/0250951 A1 | 8/2017 | Wang et al. |
| 2017/0257424 A1 | 9/2017 | Neogi et al. |
| 2017/0284839 A1 | 10/2017 | Ojala |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0324518 A1 | 11/2017 | Meng et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0005427 A1 | 1/2018 | Marvie et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0032905 A1 | 2/2018 | Abercrombie |
| 2018/0098123 A1 | 4/2018 | Larson et al. |
| 2018/0145906 A1 | 5/2018 | Yadav et al. |
| 2018/0191617 A1 | 7/2018 | Caulfield et al. |
| 2020/0225110 A1 | 7/2020 | Knauss et al. |
| 2020/0273040 A1 | 8/2020 | Novick et al. |
| 2020/0279055 A1 | 9/2020 | Nambiar et al. |
| 2020/0396129 A1 | 12/2020 | Tedaldi et al. |
| 2022/0141103 A1 | 5/2022 | Gandham et al. |

FOREIGN PATENT DOCUMENTS

| CN | 101093452 | | 12/2007 |
|---|---|---|---|
| CN | 101465763 | A | 6/2009 |
| CN | 101667935 | A | 3/2010 |
| CN | 101770551 | | 7/2010 |
| CN | 102204170 | A | 9/2011 |
| CN | 102521537 | | 6/2012 |
| CN | 103023970 | | 4/2013 |
| CN | 103699664 | A | 4/2014 |
| CN | 103716137 | | 4/2014 |
| CN | 104065518 | | 9/2014 |
| CN | 107196807 | | 9/2017 |
| EP | 0811942 | | 12/1997 |
| EP | 1039690 | A2 | 9/2000 |
| EP | 1069741 | A1 | 1/2001 |
| EP | 1076848 | | 7/2002 |
| EP | 1383261 | | 1/2004 |
| EP | 1450511 | | 8/2004 |
| EP | 2045974 | | 4/2008 |
| EP | 2043320 | | 4/2009 |
| EP | 2427022 | A1 | 3/2012 |
| EP | 2723034 | A1 | 4/2014 |
| EP | 2860912 | | 4/2015 |
| EP | 2887595 | | 6/2015 |
| EP | 3069241 | B1 | 8/2018 |
| EP | 3793166 | A1 | 3/2021 |
| IN | 102142009 | A | 8/2011 |
| JP | 2009-016906 | | 1/2009 |
| JP | 4460763 | B2 | 5/2010 |
| KR | 1394338 | | 5/2014 |
| WO | 0145370 | A1 | 6/2001 |
| WO | 2006045793 | A1 | 5/2006 |
| WO | WO 2007/014314 | | 2/2007 |
| WO | 2007042171 | A1 | 4/2007 |
| WO | WO 2007/070711 | | 6/2007 |
| WO | 2007139842 | A2 | 12/2007 |
| WO | WO 2008/069439 | | 6/2008 |
| WO | 2010048693 | A1 | 5/2010 |
| WO | 2010059972 | A2 | 5/2010 |
| WO | 2012139288 | A1 | 10/2012 |
| WO | 2012162419 | A2 | 11/2012 |
| WO | WO 2013/030830 | | 3/2013 |
| WO | 2013055812 | A1 | 4/2013 |
| WO | 2013126759 | A2 | 8/2013 |
| WO | 2014127008 | A1 | 8/2014 |
| WO | WO 2015/042171 | | 3/2015 |
| WO | WO 2015/099778 | | 7/2015 |
| WO | 2015118454 | A1 | 8/2015 |
| WO | WO 2016/004075 | | 1/2016 |
| WO | WO 2016/019523 | | 2/2016 |

OTHER PUBLICATIONS

Aniszczyk C., "Distributed Systems Tracing with Zipkin," Twitter Blog, Jun. 7, 2012, 3 Pages, [Retrieved on Jan. 26, 2021] Retrieved from URL: https://blog.twitter.com/engineering/en_us/a/2012/

(56) References Cited

OTHER PUBLICATIONS distributed-systems-tracing-with-zipkin.html.

Ayers A., et al., "TraceBack: First Fault Diagnosis by Reconstruction of Distributed Control Flow," Proceedings of the 2009 ACM SIGPLAN Conference on Programming Language Design and Implementation-PLDI '09, Jun. 12-15, 2005, vol. 40, No. 6, 13 pages.

Baah G.K., et al., "The Probabilistic Program Dependence Graph and Its Application to Fault Diagnosis," IEEE Transactions on Software Engineering, IEEE Service Center, Los Alamitos, CA, US, Jul./Aug. 2010, vol. 36, No. 4, pp. 528-545, ISSN 0098-5589, XP011299543.

Brahmi H.I., et al., "Improving Emergency Messages Transmission Delay in Road Monitoring Based WSNs," 6th Joint FIP Wireless and Mobile Networking Conference (WMNC), 2013, 8 Pages, [Retrieved on Aug. 31, 2021].

Choi C.H., et al., "CSMonitor: A Visual Client/Server Monitor for CORBA-based Distributed Applications," Proceedings of 1998 Asia Pacific Software Engineering Conference, Taipei, Taiwan, Los Alamitos, CA, USA, Dec. 2-4, 1998, 8 Pages, DOI:10.1109/APSEC. 1998.733738, ISBN 978-0-8186-9183-6, XP010314829.

Cisco Systems, Inc., "CCNA2 v3.1 Module 1 WANs and Routers," Cisco.com, May 14, 2018, 26 pages.

Cisco Systems, Inc., "CCNA2 v3.1 Module 2 Introduction to Routers," Cisco.com, Jan. 18, 2018, 23 pages.

Citirx, "AppFlow: Next-Generation Application Performance Monitoring," Citirx.com, 2011, pp. 1-8.

Diaz J.M., et al., "A Simple Closed-Form Approximation for the Packet Loss Rate of a TCP Connection Over Wireless Links," IEEE Communications Letters, Sep. 2014, vol. 18, No. 9, 4 Pages.

Extended European Search Report for European Application No. 19215055.5, mailed Jan. 17, 2020, 9 Pages.

Extended European Search Report for European Application No. 20165008.2, mailed May 25, 2020, 6 pages.

Extended European Search Report for European Application No. 21150804.9, mailed May 6, 2021, 8 Pages.

Extended European Search Report for European Application No. 21156151.9, mailed May 25, 2021, 8 pages.

Extended European Search Report for European Application No. 21190461.0, mailed Mar. 1, 2022, 10 Pages.

Github, "OpenTracing," 10 pages, Retrieved on Jul. 5, 2023, from URL: https://github.com/opentracing/specification/blob/master/specification.md.

Goins A., et al., "Diving Deep into Kubernetes Networking," Rancher, Jan. 2019, 42 pages.

Grove D., et al., "Call Graph Construction in Object-Oriented Languages," ACM Object-oriented Programming, Systems, Languages, and Applications—OOPSLA '97 Conference Proceedings, Oct. 1997, 18 pages.

Henke C., et al., "Evaluation of Header Field Entropy forHash-Based Packet Selection," based on Search String from Google: "entropy header fields," Obtained on: Nov. 12, 2019, Passive and Active Network Measurement—PAM, 2008, vol. 4979, pp. 82-91.

Hogg S., "Not your Father's Flow Export Protocol (Part 2), What is AppFlow and how does it Differ From Other Flow Analysis Protocols?," Core Networking, Mar. 19, 2014, 6 pages.

Ihler A., et al., "Learning to Detect Events With Markov-Modulated Poisson Processes," ACM Transactions on Knowledge Discovery From Data, Dec. 2007, vol. 1, No. 3, Article 13, pp. 13:1 to 13:23.

International Search Report and Written Opinion for International Application No. PCT/US2016/035348, mailed Jul. 27, 2016, 8 pages.

International Search Report and Written Opinion for International Application No. PCT/US2016/035349, mailed Jul. 27, 2016, 8 pages.

International Search Report and Written Opinion for International Application No. PCT/US2016/035350, mailed Aug. 17, 2016, 13 pages.

International Search Report and Written Opinion for International Application No. PCT/US2016/035351, mailed Aug. 10, 2016, 15 pages.

Juels A., "RFID Security and Privacy: A Research Survey," Feb. 2006, IEEE Journal on Selected Areas in Communications, vol. 24, No. 2, pp. 381-394.

Kalyanasundaram B., et al., "Using Mobile Data Collectors to Federate Clusters of Disjoint Sensor Network Segments," IEEE, International Conference on Communications, Department of Computer Science and Electrical Engineering, University of Maryland Baltimore County, 2013, pp. 1496-1500.

Kubernetes Blog, "Borg: The Predecessor to Kubernetes," Apr. 23, 2015, 2 pages, Retrieved from URL: https://kubernetes.io/blog/2015/04/borg-predecessor-to-kubernetes/.

Kubernetes IO, "Kubernetes Components," Aug. 28, 2020, 4 pages, Retrieved from URL: https://kubernetes.io/docs/concepts/overview/components/.

Kubernetes IO, "Nodes," Jan. 12, 2021, 6 pages, Retrieved from URL: https://kubernetes.io/docs/concepts/architecture/nodes/.

Kubernetes IO, "Pods," Jan. 12, 2021, 5 pages, Retrieved from URL: https://kubernetes.io.docs/concepts/workloads/pods/pod/.

Kubernetes IO, "What is Kubernetes?," Oct. 22, 2020, 3 pages, Retrieved from URL: https://kubernetes.io/docs/concepts/overview/what-is-kubernetes/.

Merriam-Webster, "Definition of Database," Merriam-Webster Dictionary, 2018, 4 Pages.

Miller N., et al., "Collecting Network Status Information for Network-Aware Applications," International Conference on Computer Communications IEEE (INFOCOM), 2000, pp. 1-10.

Moe J., et al., "Understanding Distributed Systems via Execution Trace Data," Proceedings of the 9th International Workshop on Program Comprehension, Toronto, Canada, May 12-13, 2001, 8 Pages.

Nagarajan R., et al., "Approximation Techniques for Computing Packet Loss in Finite-buffered Voice Multiplexers," IEEE Journal on Selected Areas in Communications, Apr. 1991, vol. 9, No. 3, pp. 368-377.

Notification Concerning Transmittal of International Preliminary Report on Patentability for International Application No. PCT/US2016/035348, mailed Dec. 14, 2017, 7 pages.

Notification Concerning Transmittal of International Preliminary Report on Patentability for International Application No. PCT/US2016/035349, mailed Dec. 14, 2017, 7 pages.

Notification Concerning Transmittal of International Preliminary Report on Patentability for International Application No. PCT/US2016/035350, mailed Dec. 14, 2017, 11 pages.

Notification Concerning Transmittal of International Preliminary Report on Patentability for International Application No. PCT/US2016/035351, mailed Dec. 14, 2017, 11 pages.

Opentracing IO, "The OpenTracing Semantic Specification," 8 pages, Retrieved on Jul. 5, 2023, from URL: https://opentracing.io/docs/.

Sandholm T., et al., "MapReduce Optimization Using Regulated Dynamic Prioritization," ACM, Jun. 15-19, 2009, pp. 299-310.

Sardella A., "Securing Service Provider Networks: Protecting Infrastructure and Managing Customer Security," Juniper Networks, Inc., White Paper, Dec. 2006, pp. 1-19.

Senel F., et al., "Optimized Interconnection of Disjoint Wireless Sensor Network Segments Using K Mobile Data Collectors," IEEE International Conference on Communications (ICC), Jun. 2012, pp. 497-501.

Sherri S., et al., "A Chipset Level Network Backdoor: Bypassing Host-Based Firewall & IDS," ACM 2009, pp. 125-134.

Sigelman B.H., et al., "Dapper, A Large-Scale Distributed Systems Tracing Infrastructure," Google Technical Report dapper-2010-1, Apr. 2010, 14 Pages, Retrieved from the Internet: URL: https://research.google/pubs/pub36356/.

Templeton S.J., et al., "Detecting Spoofed Packets," IEEE, Proceedings of the DARPA Information Survivability Conference and Exposition (DISCEX'03), 2003, pp. 1-12.

(56)                    References Cited

OTHER PUBLICATIONS

Zhang D., et al., "Packet Loss Measurement and Control for VPN based Services," Proceedings of IEEE Instrumentation and Measurement Technology Conference, May 17-19, 2005, vol. 3, 5 Pages.

Crisan D., et al., "Datacenter Applications in Virtualized Networks: A Cross-Layer Performance Study", IEEE Journal on Selected Areas in Communications, vol. 32, No. 1, Retrieved on Oct. 1, 2023, Published on Jan. 1, 2014, pp. 77-87.

European Search Report in European Patent Application No. 23176492. 9, dated Oct. 6, 2023, 5 Pages.

Wang J.Y., et al., "Continuous Data Collection in Wireless Sensor Networks through PNC and Distributed Storage", 2007 International Conference on Wireless Communications, Networking and Mobile Computing, 2007, pp. 2568-2571.

Office Action for European Application No. 21190461.0, dated Feb. 12, 2024, 7 Pages.

Suo K., et al., "vNetTracer: Efficient and Programmable Packet Tracing in Virtualized Networks", 2018 IEEE 38th International Conference on Distributed Computing Systems (ICDCS), Jul. 2-6, 2018, pp. 165-175.

Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.

Arista Networks, Inc., "Application Visibility and Network Telemtry using Splunk," Arista White Paper, Nov. 2013, 11 pages.

Australian Government Department of Defence, Intelligence and Security, "Top 4 Strategies to Mitigate Targeted Cyber Intrusions," Cyber Security Operations Centre Jul. 2013, http://www.asd.gov. au/infosec/top-mitigations/top-4-strategies-explained.htm.

Author Unknown, "Blacklists & Dynamic Reputation: Understanding Why the Evolving Threat Eludes Blacklists," www.dambala. com, 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Baek, Kwang-Hyun, et al., "Preventing Theft of Quality of Service on Open Platforms," 2005 Workshop of the 1st International Conference on Security and Privacy for Emerging Areas in Communication Networks, 2005, 12 pages.

Bauch, Petr, "Reader's Report of Master's Thesis, Analysis and Testing of Distributed NoSQL Datastore Riak," May 28, 2015, Brno. 2 pages.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/ entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, tiled Jan. 21, 2015, entitled "Monitoring Network Policy Compliance."

Bosch, Greg, "Virtualization," 2010, 33 pages.

Breen, Christopher, "MAC 911, How to dismiss Mac App Store Notifications," Macworld.com, Mar. 24, 2014, 3 pages.

Brocade Communications Systems, Inc., "Chapter 5—Configuring Virtual LANs (VLANs), " Jun. 2009, 38 pages.

Chandran, Midhun, et al., "Monitoring in a Virtualized Environment," GSTF International Journal on Computing, vol. 1, No. 1, Aug. 2010.

Chari, Suresh, et al., "Ensuring continuous compliance through reconciling policy with usage," Proceedings of the 18th ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Chou, C.W., et al., "Optical Clocks and Relativity," Science vol. 329, Sep. 24, 2010, pp. 1630-1633.

Cisco Systems, "Cisco Network Analysis Modules (NAM) Tutorial," Cisco Systems, Inc., Version 3.5.

Cisco Systems, Inc. "Cisco, Nexus 3000 Series NX-OS Release Notes, Release 5.0(3)U3(1)," Feb. 29, 2012, Part No. OL-26631-01, 16 pages.

Cisco Systems, Inc., "Addressing Compliance from One Infrastructure: Cisco Unified Compliance Solution Framework," 2014.

Cisco Systems, Inc., "Cisco—VPN Client User Guide for Windows," Release 4.6, Aug. 2004, 148 pages.

Cisco Systems, Inc., "Cisco 4710 Application Control Engine Appliance Hardware Installation Guide," Nov. 2007, 66 pages.

Cisco Systems, Inc., "Cisco Application Dependency Mapping Service," 2009.

Cisco Systems, Inc., "Cisco Data Center Network Architecture and Solutions Overview," Feb. 2006, 19 pages.

Cisco Systems, Inc., "Cisco IOS Configuration Fundamentals Configuration Guide: Using Autoinstall and Setup," Release 12.2, first published Apr. 2001, last updated Sep. 2003, 32 pages.

Cisco Systems, Inc., "Cisco VN-Link: Virtualization-Aware Networking," White Paper, Mar. 2009, 10 pages.

Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 Co, 24 pages.

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.

Cisco Systems, Inc., "Quick Start Guide, Cisco ACE 4700 Series Application Control Engine Appliance," Software Ve740rsion A5(1. 0), Sep. 2011, 138 pages.

Cisco Systems, Inc., "Routing And Bridging Guide, Cisco ACE Application Control Engine," Software Version A5(1.0), Sep. 2011, 248 pages.

Cisco Systems, Inc., "VMWare and Cisco Virtualization Solution: Scale Virtual Machine Networking," Jul. 2009, 4 pages.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Systems, Inc., "Cisco Application Visibility and Control," Oct. 2011, 2 pages.

Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.

Cisco Systems, Inc., "Cisco Tetration Platform Data Sheet", Updated Mar. 5, 2018, 21 pages.

Cisco Technology, Inc., "Cisco IOS Software Release 12.4T Features and Hardware Support," http://www.cisco.com/c/en/us/products/ collateralhos-nx-os-softwarehos-software-releases-12-4-t/product_ bulletin_c25-409474.html; Feb. 2009, 174 pages.

Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.

Cisco Systems, Inc., "Cisco Application Control Engine (ACE) Troubleshooting Guide—Understanding the ACE Module Architecture and Traffic Flow," Mar. 11, 2011, 6 pages.

Costa, Raul, et al., "An Intelligent Alarm Management System for Large-Scale Telecommunication Companies," In Portuguese Conference on Artificial Intelligence, Oct. 2009, 14 pages.

De Carvalho, Tiago Filipe Rodrigues, "Root Cause Analysis in Large and Complex Networks," Dec. 2008, Repositorio.ul.pt, pp. 1-55.

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.

Duan, Yiheng, et al., Detective: Automatically Identify and Analyze Malware Processes in Forensic Scenarios via DLLs, IEEE ICC 2015—Next Generation Networking Symposium, pp. 5691-5696.

(56) References Cited

OTHER PUBLICATIONS

Feinstein, Laura, et al., "Statistical Approaches to DDOS Attack Detection and Response," Proceedings of the DARPA Information Survivability Conference and Exposition (DISCEX '03), Apr. 2003, 12 pages.

Foundation for Intelligent Physical Agents, "FIPA Agent Message Transport Service Specification," Dec. 3, 2002, http://www.fipa.org; 15 pages.

George, Ashley, et al., "NetPal: A Dynamic Network Administration Knowledge Base," 2008, pp. 1-14.

Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.

Goldsteen, Abigail, et al., "A Tool for Monitoring and Maintaining System Trustworthiness at Run Time," REFSQ (2015), pp. 142-147.

Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.

Heckman, Sarah, et al., "On Establishing a Benchmark for Evaluating Static Analysis Alert Prioritization and Classification Techniques," IEEE, 2008; 10 pages.

Hewlett-Packard, "Effective use of reputation intelligence in a security operations center," Jul. 2013, 6 pages.

Hideshima, Yusuke, et al., "Starmine: A Visualization System for Cyber Attacks," https://www.researchgate.net/publication/221536306, Feb. 2006, 9 pages.

Huang, Hing-Jie, et al., "Clock Skew Based Node Identification in Wireless Sensor Networks," IEEE, 2008, 5 pages.

InternetPerils, Inc., "Control Your Internet Business Risk," 2003-2015, https://www.internetperils.com.

Ives, Herbert, E., et al., "An Experimental Study of the Rate of a Moving Atomic Clock," Journal of the Optical Society of America, vol. 28, No. 7, Jul. 1938, pp. 215-226.

Janoff, Christian, et al., "Cisco Compliance Solution for HIPAA Security Rule Design and Implementation Guide," Cisco Systems, Inc., Updated Nov. 14, 2015, part 1 of 2, 350 pages.

Janoff, Christian, et al., "Cisco Compliance Solution for HIPAA Security Rule Design and Implementation Guide," Cisco Systems, Inc., Updated Nov. 14, 2015, part 2 of 2, 588 pages.

Joseph, Dilip, et al., "Modeling Middleboxes," IEEE Network, Sep./Oct. 2008, pp. 20-25.

Kent, S., et al. "Security Architecture for the Internet Protocol," Network Working Group, Nov. 1998, 67 pages.

Kerrison, Adam, et al., "Four Steps to Faster, Better Application Dependency Mapping—Laying the Foundation for Effective Business Service Models," BMCSoftware, 2011.

Kim, Myung-Sup, et al. "A Flow-based Method for Abnormal Network Traffic Detection," IEEE, 2004, pp. 599-612.

Kraemer, Brian, "Get to know your data center with CMDB," TechTarget, Apr. 5, 2006, http://searchdatacenter.techtarget.com/news/118820/Get-to-know-your-data-center-with-CMDB.

Lab SKU, "VMware Hands-on Labs—HOL-SDC-1301" Version: 20140321-160709, 2013; http://docs.hol.vmware.com/HOL-2013/holsdc-1301_html_en/ (part 1 of 2).

Lab SKU, "VMware Hands-on Labs—HOL-SDC-1301" Version: 20140321-160709, 2013; http://docs.hol.vmware.com/HOL-2013/holsdc-1301_html_en/ (part 2 of 2).

Lachance, Michael, "Dirty Little Secrets of Application Dependency Mapping," Dec. 26, 2007.

Landman, Yoav, et al., "Dependency Analyzer," Feb. 14, 2008, http://frog.com/confluence/display/DA/Home.

Lee, Sihyung, "Reducing Complexity of Large-Scale Network Configuration Management," Ph.D. Dissertation, Carniege Mellon University, 2010.

Li, Ang, et al., "Fast Anomaly Detection for Large Data Centers," Global Telecommunications Conference (GLOBECOM 2010, Dec. 2010, 6 pages.

Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.

Liu, Ting, et al., "Impala: A Middleware System for Managing Autonomic, Parallel Sensor Systems," In Proceedings of the Ninth ACM SIGPLAN Symposium on Principles And Practice of Parallel Programming(PPoPP '03), ACM, New York, NY, USA, Jun. 11-13, 2003, pp. 107-118.

Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.

Matteson, Ryan, "Depmap: Dependency Mapping of Applications Using Operating System Events: a Thesis," Master's Thesis, California Polytechnic State University, Dec. 2010.

Natarajan, Arun, et al., "NSDMiner: Automated Discovery of Network Service Dependencies," Institute of Electrical and Electronics Engineers INFOCOM, Feb. 2012, 9 pages.

Navaz, A.S. Syed, et al., "Entropy based Anomaly Detection System to Prevent DDOS Attacks in Cloud," International Journal of computer Applications (0975-8887), vol. 62, No. 15, Jan. 2013, pp. 42-47.

Neverfail, "Neverfail IT Continuity Architect," 2015, https://web.archive.org/web/20150908090456/http://www.neverfailgroup.com/products/it-continuity-architect.

Nilsson, Dennis K., et al., "Key Management And Secure Software Updates In Wireless Process Control Environments," In Proceedings of the First ACM Conference on Wireless Network Security (WiSec '08), ACM, New York, NY, USA, Mar. 31-Apr. 2, 2008, pp. 100-108.

Nunnally, Troy, et al., "P3D: A Parallel 3D Coordinate Visualization for Advanced Network Scans," IEEE 2013, June Sep. 13, 2013, 6 pages.

O'Donnell, Glenn, et al., "The CMDB Imperative: How to Realize the Dream and Avoid the Nightmares," Prentice Hall, Feb. 19, 2009.

Ohta, Kohei, et al., "Detection, Defense, and Tracking of Internet-Wide Illegal Access in a Distributed Manner," 2000, pp. 1-16.

Online Collins English Dictionary, 1 page (Year: 2018).

Pathway Systems International Inc., "How Blueprints does Integration," Apr. 15, 2014, 9 pages, http://pathwaysystems.com/company-blog/.

Pathway Systems International Inc., "What is Blueprints?" 2010-2016, http://pathwaysystems.com/blueprints-about/.

Popa, Lucian, et al., "Macroscope: End-Point Approach to Networked Application Dependency Discovery," CoNEXT'09, Dec. 1-4, 2009, Rome, Italy, 12 pages.

Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.

Sachan, Mrinmaya, et al., "Solving Electrical Networks to incorporate Supervision in Random Walks," May 13-17, 2013, pp. 109-110.

Sammarco, Matteo, et al., "Trace Selection for Improved WLAN Monitoring." Aug. 16, 2013, pp. 9-14.

Shneiderman, Ben, et al., "Network Visualization by Semantic Substrates," Visualization and Computer Graphics, vol. 12, No. 5, pp. 733,740, Sep.-Oct. 2006.

Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.

Thomas, R., "Bogon Dotted Decimal List," Version 7.0, Team Cymru NOC, Apr. 27, 2012, 5 pages.

Voris, Jonathan, et al., "Bait and Snitch: Defending Computer Systems with Decoys," Columbia University Libraries, Department of Computer Science, 2013, pp. 1-25.

Wang, Ru, et al., "Learning directed acyclic graphs via bootstarp aggregating," 2014, 47 pages, http://arxiv.org/abs/1406.2098.

(56) References Cited

OTHER PUBLICATIONS

Wang, Yongjun, et al., "A Network Gene-Based Framework for Detecting Advanced Persistent Threats," Nov. 2014, 7 pages.

Witze, Alexandra, "Special relativity aces time trial, 'Time dilation' predicted by Einstein confirmed by lithium ion experiment," Nature, Sep. 19, 2014, 3 pages.

Woodberg, Brad, "Snippet from Juniper SRX Series" Jun. 17, 2013, 1 page, O'Reilly Media, Inc.

Zatrochova, Zuzana, "Analysis and Testing of Distributed NoSQL. Datastore Riak," Spring, 2015, 76 pages.

Zeng, Sai, et al., "Managing Risk in Multi-node Automation of Endpoint Management," 2014 IEEE Network Operations and Management Symposium (NOMS), 2014, 6 pages.

Zhang, Yue, et al., "Cantina: A Content-Based Approach to Detecting Phishing Web Sites," May 8-12, 2007, pp. 639-648.

* cited by examiner

FIG. 2A
— 200
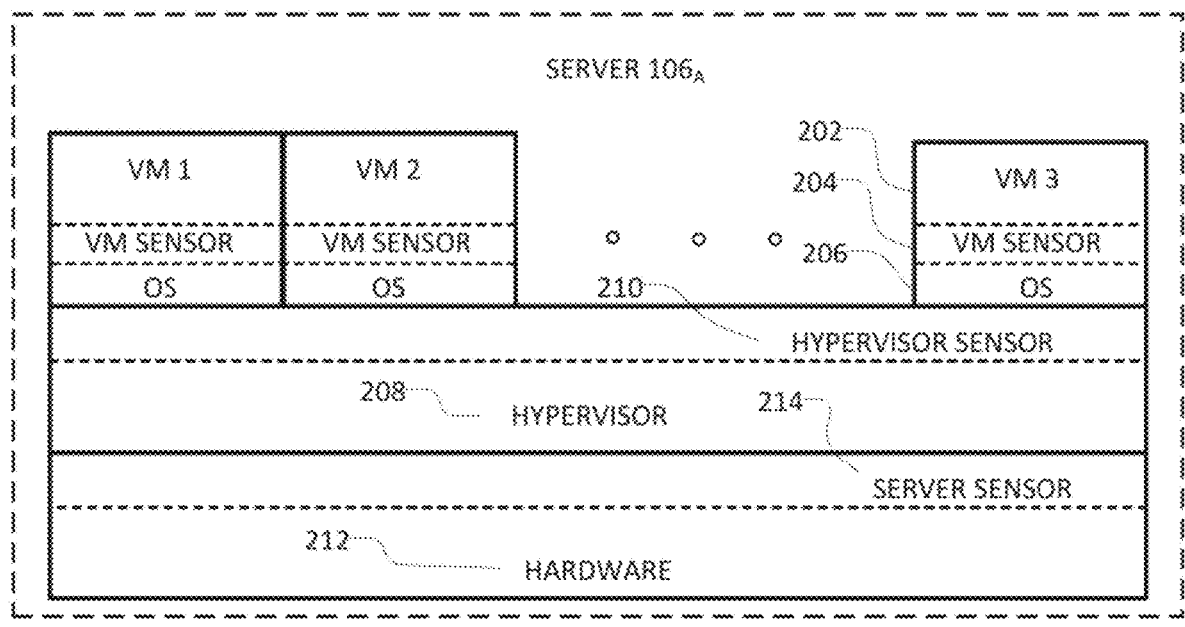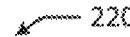
SERVER 106$_A$
VM 1
VM SENSOR
OS
VM 2
VM SENSOR
OS
202
204
206
VM 3
VM SENSOR
OS
210
HYPERVISOR SENSOR
208 — HYPERVISOR     214 —
SERVER SENSOR
212 — HARDWARE
FIG. 2B
— 220
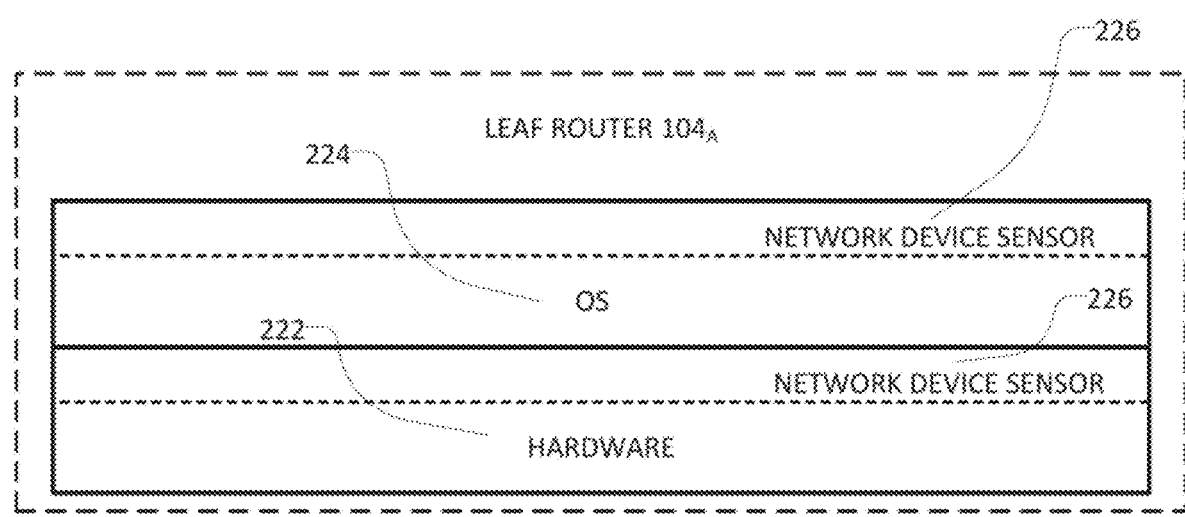
226
LEAF ROUTER 104$_A$
224
NETWORK DEVICE SENSOR
OS
222
226
NETWORK DEVICE SENSOR
HARDWARE

240

FABRIC 112

242

COLLECTOR 118

244

104_A

NETWORK DEVICE SENSOR 116

242

244

244

108_A

HYPERVISOR SENSOR 116

242

110_A

VM SENSOR 116

SERVER 106_A

302

RECEIVE DATA REPORT
304

DETERMINE TIME STAMP OF WHEN DATA REPORT WAS RECEIVED
306

DETERMINE Δ
308

ADJUST Δ WITH LATENCY BOUND
310

GENERATE ANOTHER TIMESTAMP WITH ADJUSTED Δ
312

350

SEND REQUEST PACKET
355

DETERMINE TIMESTAMP OF WHEN REQUEST PACKET WAS SENT
360

RECEIVE THE AUOMATIC REPLY PACKET
365

DETERMINE TIMESTAMP OF WHEN AUTOMATIC REPLY PACKET WAS RECEIVED
370

DETERMINE LATENCY BOUND
375

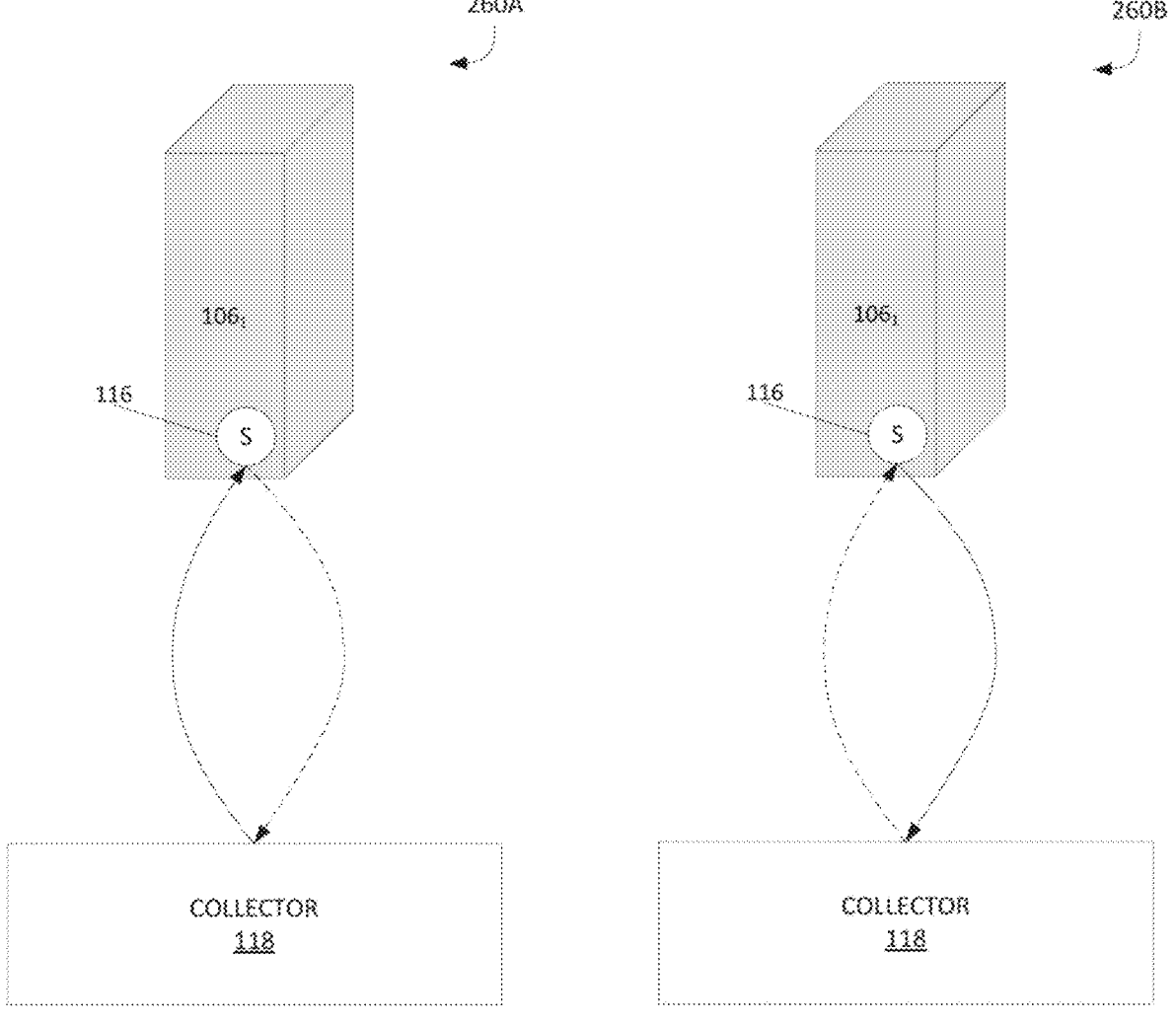
FIG. 4A                              FIG. 4B

DATA CENTER TRAFFIC ANALYTICS SYNCHRONIZATION

RELATED APPLICATIONS

This application is a continuation of U.S. Non-Provisional patent application Ser. No. 16/741,528, filed Jan. 13, 2020, which is a continuation of U.S. Non-Provisional patent application Ser. No. 15/040,829, filed Feb. 10, 2016, now U.S. Pat. No. 10,536,357, which claims the benefit of U.S. Provisional Patent Application No. 62/171,899, filed Jun. 5, 2015, the contents of which are incorporated herein by reference in their entireties.

TECHNICAL FIELD

The present technology pertains network analytics, and more specifically to synchronizing clocks of different systems in a computing environment.

BACKGROUND

Data centers typically include a large number of servers and virtual machines. Each server and virtual machine has its own internal clock, which it uses when generating any timestamps of network and system events. The accuracy of these timestamps is important when monitoring or managing the servers in these datacenters (e.g. identifying the sequence of events, correlating events, analytics of data flows and events, etc.). Monitoring a data center's servers can be especially problematic with third party monitors. Generally, these third party monitors are given limited access to these data centers (e.g. monitoring or observing the network activities of the datacenter). Additionally, the third party's internal clock of its system may not be synchronized to the data center's servers' clocks. As such, the third party will likely encounter a great deal of difficulties and problems when managing and monitoring the network of servers of the data center.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2A illustrates a schematic diagram of an example sensor deployment in a virtualized environment;

FIG. 2B illustrates a schematic diagram of an example sensor deployment in an example network device;

FIGS. 4A and 4B illustrates an example system for determining a communication latency associated with a communication channel between a sensor and a collector in accordance with various embodiments of the present technology;

DESCRIPTION OF EXAMPLE EMBODIMENTS

Overview

A network analytics system can receive first sensor data, including first network activity and a first timestamp associated with a first clock of a first node of a data center, and second sensor data, including second network activity and a second timestamp associated with a second clock of a second node of the data center. The network analytics system can determine a first delta between the first clock and a third clock of the network analytics system based on the first timestamp, and a second delta between the second clock and the third clock based on the second timestamp. The network analytics system can determine a first communication latency between the network analytics system and a first sensor of the first node, and a second communication latency between the network analytics system and a second sensor of the second node. The network analytics system can generate a report that synchronizes one or more data flows between the first node and the second node based on the first delta, the second delta, the first communication latency, and the second communication latency.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses a need for synchronizing clocks of various systems and entities in a given computing environment. For example, the disclosed technology can allow a host or node to synchronize its clock to the data center's clock. For instance, a synchronization of the timestamp(s)/clock(s) of the host(s) (or node(s) to the clock of a collector in the datacenter can be performed based on the clock of the collector. In other examples, the disclosed technology can also be implemented to address clock skew issues present in a computing environment. For instance, in some situations, even if the clocks of various entities within a computing environment are synchronized to some degree, greater precision may be desired when analyzing or monitoring the various entities or associated events and relationships (e.g., triggering events, process lineage, chronology, etc.).

Figure 1:
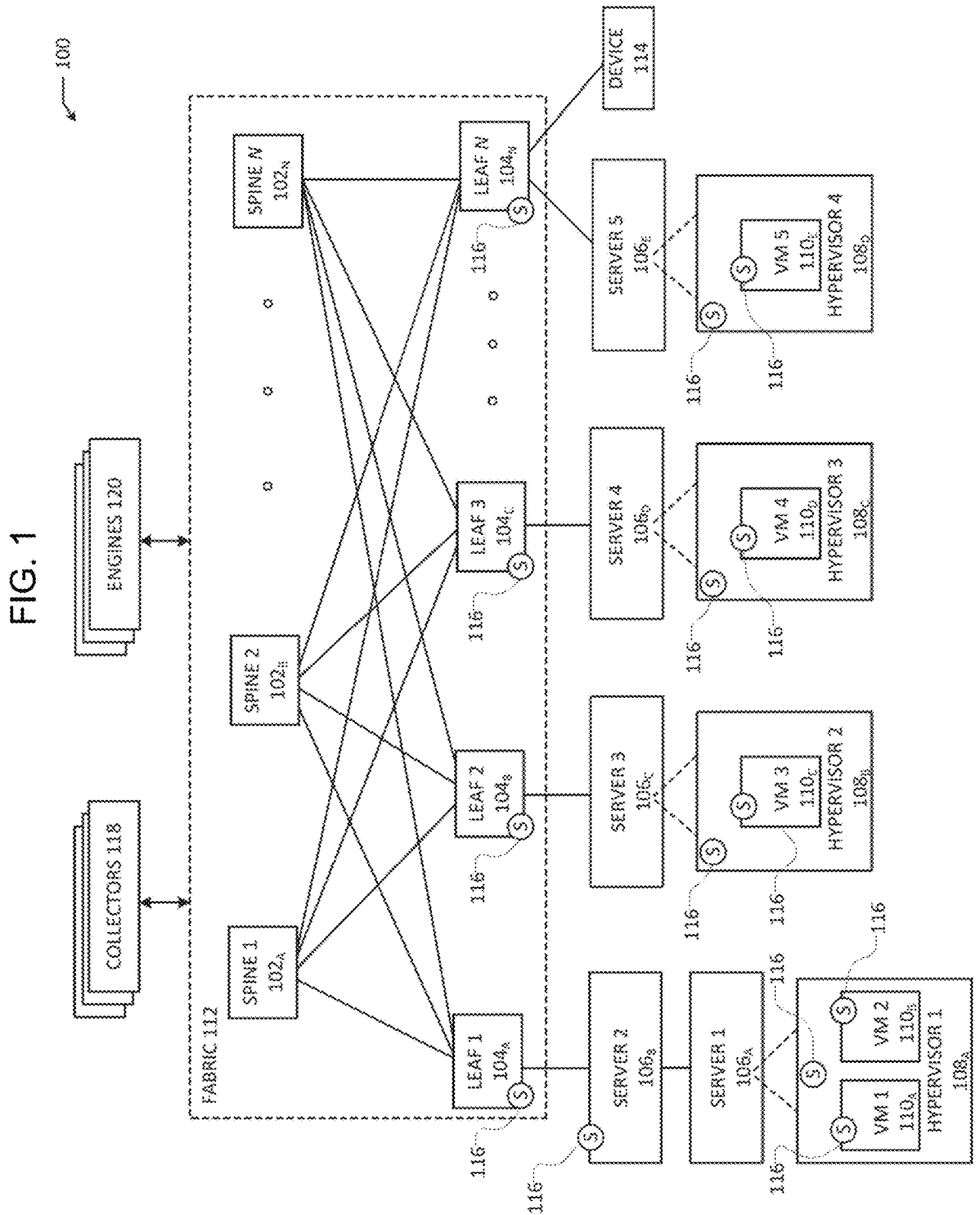
FIG. 1 illustrates a diagram of an example network environment for implementing various embodiments of the present technology.

FIG. 1 illustrates a diagram of an example network environment 100. Fabric 112 can represent the underlay (i.e., physical network) of network environment 100. Fabric 112 can include spine routers 1-N ($102_{A-N}$) (collectively "102") and leaf routers 1-N ($104_{A-N}$) (collectively "104"). Leaf routers 104 can reside at the edge of fabric 112, and can thus represent the physical network edge. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from the spine routers 102 to leaf routers 104, and vice versa.

Leaf routers 104 can provide servers 1-5 ($106_{A-E}$) (collectively "106"), hypervisors 1-4 ($108_A$-$108_D$) (collectively "108"), and virtual machines (VMs) 1-5 ($110_A$-$110_E$) (collectively "110") access to fabric 112. For example, leaf routers 104 can encapsulate and decapsulate packets to and from servers 106 in order to enable communications throughout environment 100. Leaf routers 104 can also connect other devices, such as device 114, with fabric 112. Device 114 can be any network-capable device(s) or network(s), such as a firewall, a database, a server, a collector 118 (further described below), an engine 120 (further described below), etc. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server $106_A$ and hypervisor $108_A$ can host VMs $110_{A-B}$.

In some cases, VMs 110 and/or hypervisors 108 can be migrated to other servers 106. For example, VM $110_A$ can be migrated to server $106c$ and hypervisor $108_B$. Servers 106 can similarly be migrated to other locations in network environment 100. For example, a server connected to a specific leaf router can be changed to connect to a different or additional leaf router. In some cases, some or all of the servers 106, hypervisors 108, and/or VMs 110 can represent tenant space. Tenant space can include workloads, services, applications, devices, and/or resources that are associated with one or more clients or subscribers. Accordingly, traffic in the network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Any of leaf routers 104, servers 106, hypervisors 108, and VMs 110 can include a sensor 116 configured to capture network data, and report any portion of the captured data to collector 118. Sensors 116 can be processes, agents, modules, drivers, or components deployed on a respective system (e.g., a server, VM, hypervisor, leaf router, etc.), configured to capture network data for the respective system (e.g., data received or transmitted by the respective system), and report some or all of the captured data to collector 118.

For example, a VM sensor can run as a process, kernel module, or kernel driver on the guest operating system installed in a VM and configured to capture data (e.g., network and/or system data) processed (e.g., sent, received, generated, etc.) by the VM. A hypervisor sensor can run as a process, kernel module, or kernel driver on the host operating system installed at the hypervisor layer and configured to capture data (e.g., network and/or system data) processed (e.g., sent, received, generated, etc.) by the hypervisor. A server sensor can run as a process, kernel module, or kernel driver on the host operating system of a server and configured to capture data (e.g., network and/or system data) processed (e.g., sent, received, generated, etc.) by the server. And a network device sensor can run as a process or component in a network device, such as leaf routers 104, and configured to capture data (e.g., network and/or system data) processed (e.g., sent, received, generated, etc.) by the network device.

Sensors 116 can be configured to report data and/or metadata about one or more packets, flows, communications, processes, events, and/or activities observed to collector 118. For example, sensors 116 can capture network data as well as information about the system or host of the sensors 116 (e.g., where the sensors 116 are deployed). Such information can also include, for example, data or metadata of active or previously active processes of the system, metadata of files on the system, system alerts, networking information, etc. Reported data from sensors 116 can provide details or statistics particular to one or more tenants. For example, reported data from a subset of sensors 116 deployed throughout devices or elements in a tenant space can provide information about the performance, use, quality, events, processes, security status, characteristics, statistics, patterns, conditions, configurations, topology, and/or any other information for the particular tenant space.

Additionally, the reports of sensors 116 can include timestamps associated with captured network traffic received, transmitted or generated by the host/node (e.g. VM, hypervisor, server, and leaf router). Sensors 116 can also associate a timestamp indicating when sensors 116 send the reports to collectors 118. Regardless, the timestamps can be based on the clock of the host (e.g., server, switch, VM, hypervisor, etc.) of where the sensor resides. For example, timestamps associated with sensors 116 residing on hypervisor 2 $108_B$ can be based on the clock of hypervisor 2 $108_B$. Furthermore, since multiple sensors 116 can reside on the same host, the reports of the multiple sensors 116 can be based on a same clock associated with the host or multiple clocks associated with the host. Collectors 118 can be one or more devices, modules, workloads and/or processes capable of receiving data from sensors 116. Collectors 118 can thus collect reports and data from sensors 116. Collectors 118 can be deployed anywhere in network environment 100 and/or even on remote networks capable of communicating with network environment 100. For example, one or more collectors can be deployed within fabric 112 or on one or more of the servers 106. One or more collectors can be deployed outside of fabric 112 but connected to one or more leaf routers 104. Collectors 118 can be part of servers 106 and/or separate servers or devices (e.g., device 114). Collectors 118 can also be implemented in a cluster of servers.

Collectors 118 can be configured to collect data from sensors 116. In addition, collectors 118 can be implemented in one or more servers. As previously noted, collectors 118 can include one or more collectors. Moreover, each collector can be configured to receive reported data from all sensors 116 or a subset of sensors 116. For example, a collector can be assigned to a subset of sensors 116 so the data received by that specific collector is limited to data from the subset of sensors.

Collectors 118 can be configured to aggregate data from all sensors 116 and/or a subset of sensors 116. Moreover, collectors 118 can be configured to analyze some or all of the data reported by sensors 116. For example, collectors 118 can include analytics engines (e.g., engines 120) for analyzing collected data. Environment 100 can also include separate analytics engines 120 configured to analyze the data reported to collectors 118. For example, engines 120 can be configured to receive collected data from collectors 118 and aggregate the data, analyze the data (individually and/or aggregated), generate reports, identify conditions, compute statistics, visualize reported data, troubleshoot conditions, visualize the network and/or portions of the network (e.g., a tenant space), generate alerts, identify patterns, calculate misconfigurations, identify errors, generate suggestions, generate testing, and/or any other analytics functions.

While collectors 118 and engines 120 are shown as separate entities, this is for illustration purposes as other configurations are also contemplated herein. For example, any of collectors 118 and engines 120 can be part of a same or separate entity. Moreover, any of the collector, aggregation, and analytics functions can be implemented by one entity (e.g., collectors 118) or separately implemented by multiple entities (e.g., engine 120 and/or collectors 118).

Each of the sensors 116 can use a respective address (e.g., internet protocol (IP) address, port number, etc.) of their host to send information to collectors 118 and/or any other destination. Moreover, sensors 116 can periodically send information about flows they observe to collectors 118. Sensors 116 can be configured to report each and every flow they observe. Sensors 116 can report a list of flows that were active during a period of time (e.g., between the current time and the time of the last report). The communication channel between a sensor and collector 118 can also create a flow in every reporting interval. Thus, the information transmitted or reported by sensors 116 can also include information about the flow created by the communication channel.

FIG. 2A illustrates a schematic diagram of an example sensor deployment 260 in a virtualized environment. Server 106$_A$ can run and host one or more VMs 202. VMs 202 can be configured to run workloads (e.g., applications, services, processes, functions, etc.) based on hardware resources 212 on server 106$_A$. VMs 202 can run on guest operating systems 206 on a virtual operating platform provided by hypervisor 208. Each VM can run a respective guest operating system which can be the same or different as other guest operating systems associated with other VMs on server 106$_A$. Moreover, each VM can have one or more network addresses, such as an internet protocol (IP) address. VMs 202 can thus communicate with hypervisor 208, server 106$_A$, and/or any remote devices or networks using the one or more network addresses.

Hypervisor 208 can be a layer of software, firmware, and/or hardware that creates and runs VMs 202. The guest operating systems running on VMs 202 can share virtualized hardware resources created by hypervisor 208. The virtualized hardware resources can provide the illusion of separate hardware components. Moreover, the virtualized hardware resources can perform as physical hardware components (e.g., memory, storage, processor, network interface, etc.), and can be driven by hardware resources 212 on server 106$_A$. Hypervisor 208 can have one or more network addresses, such as an internet protocol (IP) address, to communicate with other devices, components, or networks. For example, hypervisor 208 can have a dedicated IP address which it can use to communicate with VMs 202, server 106$_A$, and/or any remote devices or networks.

Hardware resources 212 of server 106$_A$ can provide the underlying physical hardware driving operations and functionalities provided by server 106$_A$, hypervisor 208, and VMs 202. Hardware resources 212 can include, for example, one or more memory resources, one or more storage resources, one or more communication interfaces, one or more processors, one or more circuit boards, one or more extension cards, one or more power supplies, one or more antennas, one or more peripheral components, etc. Additional examples of hardware resources are described below with reference to FIGS. 6 and 7.

Server 106$_A$ can also include one or more host operating systems. The number of host operating system can vary by configuration. For example, some configurations can include a dual boot configuration that allows server 106$_A$ to boot into one of multiple host operating systems. In other configurations, server 106$_A$ may run a single host operating system. Host operating systems can run on hardware resources 212. In some cases, hypervisor 208 can run on, or utilize, a host operating system on server 106$_A$.

Server 106$_A$ can also have one or more network addresses, such as an internet protocol (IP) address, to communicate with other devices, components, or networks. For example, server 106$_A$ can have an IP address assigned to a communications interface from hardware resources 212, which it can use to communicate with VMs 202, hypervisor 208, leaf router 104$_A$ in FIG. 1, collectors 118 in FIG. 1, and/or any remote devices or networks.

VM sensors 204 can be deployed on one or more of the VMs 202. VM sensors 204 can be data and packet inspection agents deployed on the VMs 202 to capture packets, flows, processes, events, traffic, and/or any data flowing through the VMs 202. VM sensors 204 can be configured to export or report any data collected or captured by the sensors 204 to a remote entity, such as collectors 118, for example. VM sensors 204 can communicate or report such data using a network address of the respective VMs 202 (e.g., VM IP address).

VM sensors 204 can capture and report any traffic (e.g., packets, flows, etc.) sent, received, generated, and/or processed by VMs 202. For example, sensors 204 can report every packet or flow of communication sent and received by VMs 202. Moreover, any communication sent or received by VMs 202, including data reported from sensors 204, can create a network flow. VM sensors 204 can report such flows to a remote device, such as collectors 118 illustrated in FIG. 1. VM sensors 204 can report each flow separately or aggregated with other flows. When reporting a flow, VM sensors 204 can include a sensor identifier that identifies sensors 204 as reporting the associated flow. VM sensors 204 can also include a flow identifier, an IP address, a timestamp, metadata, a process ID, and any other information, as further described below.

VM sensors 204 can also report multiple flows as a set of flows. When reporting a set of flows, VM sensors 204 can include a flow identifier for the set of flows and/or a flow identifier for each flow in the set of flows. VM sensors 204 can also include one or more timestamps and other information as previously explained.

VM sensors 204 can run as a process, kernel module, or kernel driver on the guest operating systems 206 of VMs 202. VM sensors 204 can thus monitor any traffic sent and received by VMs 202, any processes running on the guest operating systems 206, any workloads on VMs 202, etc.

Hypervisor sensor 210 can be deployed on hypervisor 208. Hypervisor sensor 210 can be a data inspection agent deployed on hypervisor 208 to capture traffic (e.g., packets, flows, etc.) and/or data flowing through hypervisor 208. Hypervisor sensor 210 can be configured to export or report any data collected or captured by hypervisor sensor 210 to a remote entity, such as collectors 118, for example. Hypervisor sensor 210 can communicate or report such data using a network address of hypervisor 208, such as an IP address of hypervisor 208.

Because hypervisor 208 can see traffic and data from VMs 202, hypervisor sensor 210 can also capture and report any data (e.g., traffic data) associated with VMs 202. For example, hypervisor sensor 210 can report every packet or flow of communication sent or received by VMs 202 and/or VM sensors 204. Moreover, any communication sent or received by hypervisor 208, including data reported from hypervisor sensor 210, can create a network flow. Hypervisor sensor 210 can report such flows to a remote device, such as collectors 118 illustrated in FIG. 1. Hypervisor sensor 210 can report each flow separately and/or in combination with other flows or data. When reporting a flow, hypervisor sensor 210 can include a sensor identifier that identifies hypervisor sensor 210 as reporting the flow. Hypervisor sensor 210 can also include a flow identifier, an IP address, a timestamp, metadata, a process ID, and any other information, as explained below.

Hypervisor sensor 210 can also report multiple flows as a set of flows. When reporting a set of flows, hypervisor sensor 210 can include a flow identifier for the set of flows and/or a flow identifier for each flow in the set of flows. Hypervisor sensor 210 can also include one or more timestamps and other information as previously explained.

As previously explained, any communication captured or reported by VM sensors 204 can flow through hypervisor 208. Thus, hypervisor sensor 210 can observe and capture any flows or packets reported by VM sensors 204. Accordingly, hypervisor sensor 210 can also report any packets or flows reported by VM sensors 204. For example, VM sensor A on VM A captures flow 1 (F1) and reports F1 to collector 118 on FIG. 1. Hypervisor sensor 210 on hypervisor 208 can also see and capture F1, as F1 would traverse hypervisor 208 when being sent or received by VM A. Accordingly, hypervisor sensor 210 on hypervisor 208 can also report F1 to collector 118. Thus, collector 118 can receive a report of F1 from VM sensor A on VM A and another report of F1 from hypervisor sensor 210 on hypervisor 208.

When reporting F1, hypervisor sensor 210 can report F1 as a message or a separate from the message or report of F1 transmitted by VM sensor A on VM A. However, hypervisor sensor 210 can also, or otherwise, report F1 as a message or report that includes or appends the message or report of F1 transmitted by VM sensor A on VM A. In other words, hypervisor sensor 210 can report F1 as a separate message or report from VM sensor A's message or report of F1, and/or a same message or report that includes both a report of F1 by hypervisor sensor 210 and the report of F1 by VM sensor A at VM A. In this way, VM sensors 204 at VMs 202 can report packets or flows received or sent by VMs 202, and hypervisor sensor 210 at hypervisor 208 can report packets or flows received or sent by hypervisor 208, including any flows or packets received or sent by VMs 202 and/or reported by VM sensors 204.

Hypervisor sensor 210 can run as a process, kernel module, or kernel driver on the host operating system associated with hypervisor 208. Hypervisor sensor 210 can thus monitor any traffic sent and received by hypervisor 208, any processes associated with hypervisor 208, etc.

Server 106$_A$ can also have a server sensor 214 running on it. Server sensor 214 can be a data inspection agent deployed on server 106$_A$ to capture data (e.g., packets, flows, traffic data, etc.) on server 106$_A$. Server sensor 214 can be configured to export or report any data collected or captured by server sensor 214 to a remote entity, such as collector 118, for example. Server sensor 214 can communicate or report such data using a network address of server 106$_A$, such as an IP address of server 106$_A$.

Server sensor 214 can capture and report any packet or flow of communication associated with server 106$_A$. For example, sensor 216 can report every packet or flow of communication sent or received by one or more communication interfaces of server 106$_A$. Moreover, any communication sent or received by server 106$_A$, including data reported from sensors 204 and 210, can create a network flow. Server sensor 214 can report such flows to a remote device, such as collector 118 illustrated in FIG. 1. Server sensor 214 can report each flow separately or in combination. When reporting a flow, server sensor 214 can include a sensor identifier that identifies server sensor 214 as reporting the associated flow. Server sensor 214 can also include a flow identifier, an IP address, a timestamp, metadata, a process ID, and any other information.

Server sensor 214 can also report multiple flows as a set of flows. When reporting a set of flows, server sensor 214 can include a flow identifier for the set of flows and/or a flow identifier for each flow in the set of flows. Server sensor 214 can also include one or more timestamps and other information as previously explained.

Any communications capture or reported by sensors 204 and 210 can flow through server 106$_A$. Thus, server sensor 214 can observe or capture any flows or packets reported by sensors 204 and 210. In other words, network data observed by sensors 204 and 210 inside VMs 202 and hypervisor 208 can be a subset of the data observed by server sensor 214 on server 106$_A$. Accordingly, server sensor 214 can report any packets or flows reported by sensors 204 and 210. For example, sensor A on VM A captures flow 1 (F1) and reports F1 to collector 118 on FIG. 1. Sensor 210 on hypervisor 208 can also see and capture F1, as F1 would traverse hypervisor 208 when being sent or received by VM A. In addition, sensor 214 on server 106$_A$ can also see and capture F1, as F1 would traverse server 106$_A$ when being sent or received by VM A and hypervisor 208. Accordingly, sensor 216 can also report F1 to collector 118. Thus, collector 118 can receive a report of F1 from sensor A on VM A, sensor 210 on hypervisor 208, and sensor 214 on server 106$_A$.

When reporting F1, server sensor 214 can report F1 as a message or report that is separate from any messages or reports of F1 transmitted by sensor A on VM A or sensor 210 on hypervisor 208. However, server sensor 214 can also, or otherwise, report F1 as a message or report that includes or appends the messages or reports or metadata of F1 transmitted by sensor A on VM A and sensor 210 on hypervisor 208. In other words, server sensor 214 can report F1 as a separate message or report from the messages or reports of F1 from sensor A and sensor 210, and/or a same message or report that includes a report of F1 by sensor A, sensor 210, and sensor 214. In this way, sensors 204 at VMs 202 can report packets or flows received or sent by VMs 202, sensor 210 at hypervisor 208 can report packets or flows received or sent by hypervisor 208, including any flows or packets received or sent by VMs 202 and reported by sensors 204, and sensor 214 at server 106$_A$ can report packets or flows received or sent by server $106_A$, including any flows or packets received or sent by VMs 202 and reported by sensors 204, and any flows or packets received or sent by hypervisor 208 and reported by sensor 210.

Server sensor 214 can run as a process, kernel module, or kernel driver on the host operating system or a component of server $106_A$. Server sensor 214 can thus monitor any traffic sent and received by server $106_A$, any processes associated with server $106_A$, etc.

In addition to network data, sensors 204, 210, and 214 can capture additional information about the system or environment in which they reside. For example, sensors 204, 210, and 214 can capture data or metadata of active or previously active processes of their respective system or environment, metadata of files on their respective system or environment, timestamps, network addressing information, flow identifiers, sensor identifiers, etc. Moreover, sensors 204, 210, 214 are not specific to any operating system environment, hypervisor environment, network environment, or hardware environment. Thus, sensors 204, 210, and 214 can operate in any environment.

As previously explained, sensors 204, 210, and 214 can send information about the network traffic they observe. This information can be sent to one or more remote devices, such as one or more servers, collectors, engines, etc. Each sensor can be configured to send respective information using a network address, such as an IP address, and any other communication details, such as port number, to one or more destination addresses or locations. Sensors 204, 210, and 214 can send metadata about one or more flows, packets, communications, processes, events, etc.

Sensors 204, 210, and 214 can periodically report information about each flow or packet they observe. The information reported can contain a list of flows or packets that were active during a period of time (e.g., between the current time and the time at which the last information was reported). The communication channel between the sensor and the destination can create a flow in every interval. For example, the communication channel between sensor 210 and collector 118 can create a control flow. Thus, the information reported by a sensor can also contain information about this control flow. For example, the information reported by sensor 210 to collector 118 can include a list of flows or packets that were active at hypervisor 208 during a period of time, as well as information about the communication channel between sensor 210 and collector 118 used to report the information by sensor 210.

The report(s) of sensors 204, 210, and 214 can include timestamps associated with captured network traffic received, transmitted or generated by the host/node (e.g. VM 3 202, hypervisor 208 and server $106_A$). Sensors 204, 210, and 214 can also associate a timestamp indicating when each respective sensor 204, 210, and 214 transmits its respective report(s) to the remote device, such as collectors 118 illustrated in FIG. 1. Regardless, the timestamps associated by sensors 204, 210, and 214 can be based on the clock of the host/node (e.g. VM 3 202, hypervisor 208 and server $106_A$) where each respective sensor resides.

FIG. 2B illustrates a schematic diagram of an example sensor deployment 220 in an example network device. Network device is described as leaf router $104_A$. However, this is for explanation purposes. Network device can be any other network device, such as any other switch, router, etc.

In this example, leaf router $104_A$ can include network resources 222, such as memory, storage, communication, processing, input, output, and other types of resources. Leaf router $104_A$ can also include an operating system environment 224. The operating system environment 224 can include any operating system, such as a network operating system. The operating system environment 224 can include processes, functions, and applications for performing networking, routing, switching, forwarding, policy implementation, messaging, monitoring, and other types of operations.

Leaf router $104_A$ can also include sensor 226. Sensor 226 can be an agent configured to capture network data, such as flows or packets, sent and received by leaf router $104_A$. Sensor 226 can also be configured to capture other information, such as processes, statistics, alerts, status information, device information, etc. Moreover, sensor 226 can be configured to report captured data to a remote device or network, such as collector 118, for example. Sensor 226 can report information using one or more network addresses associated with leaf router $104_A$. For example, sensor 226 can be configured to report information using an IP assigned to an active communications interface on leaf router $104_A$.

Leaf router $104_A$ can be configured to route traffic to and from other devices or networks, such as server $106_A$. Accordingly, sensor 226 can also report data reported by other sensors on other devices. For example, leaf router $104_A$ can be configured to route traffic sent and received by server $106_A$ to other devices. Thus, data reported from sensors deployed on server $106_A$, such as VM and hypervisor sensors on server $106_A$, would also be observed by sensor 226 and can thus be reported by sensor 226 as data observed at leaf router $104_A$. Data reported by the VM and hypervisor sensors on server $106_A$ can therefore be a subset of the data reported by sensor 226.

The report(s) of sensors 226 can include timestamps associated with captured network traffic received, transmitted or generated by the host/node (e.g. operating system environment 224 and network resources 222). Sensors 226 can also associate a timestamp indicating when each respective sensor 226 transmits its respective report(s) to the remote device, such as collectors 118 illustrated in FIG. 1. Regardless, the timestamps associated by sensors 226 can be based on a clock of the host/node (e.g. operating system environment 224 and network resources 222) where each respective sensor resides.

Sensor 226 can run as a process or component (e.g., firmware, module, hardware device, etc.) in leaf router $104_A$. Moreover, sensor 226 can be installed on leaf router $104_A$ as a software or firmware agent. In some configurations, leaf router $104_A$ itself can act as sensor 226. Moreover, sensor 226 can run within the operating system 224 and/or separate from the operating system 224.

Figure 2C:
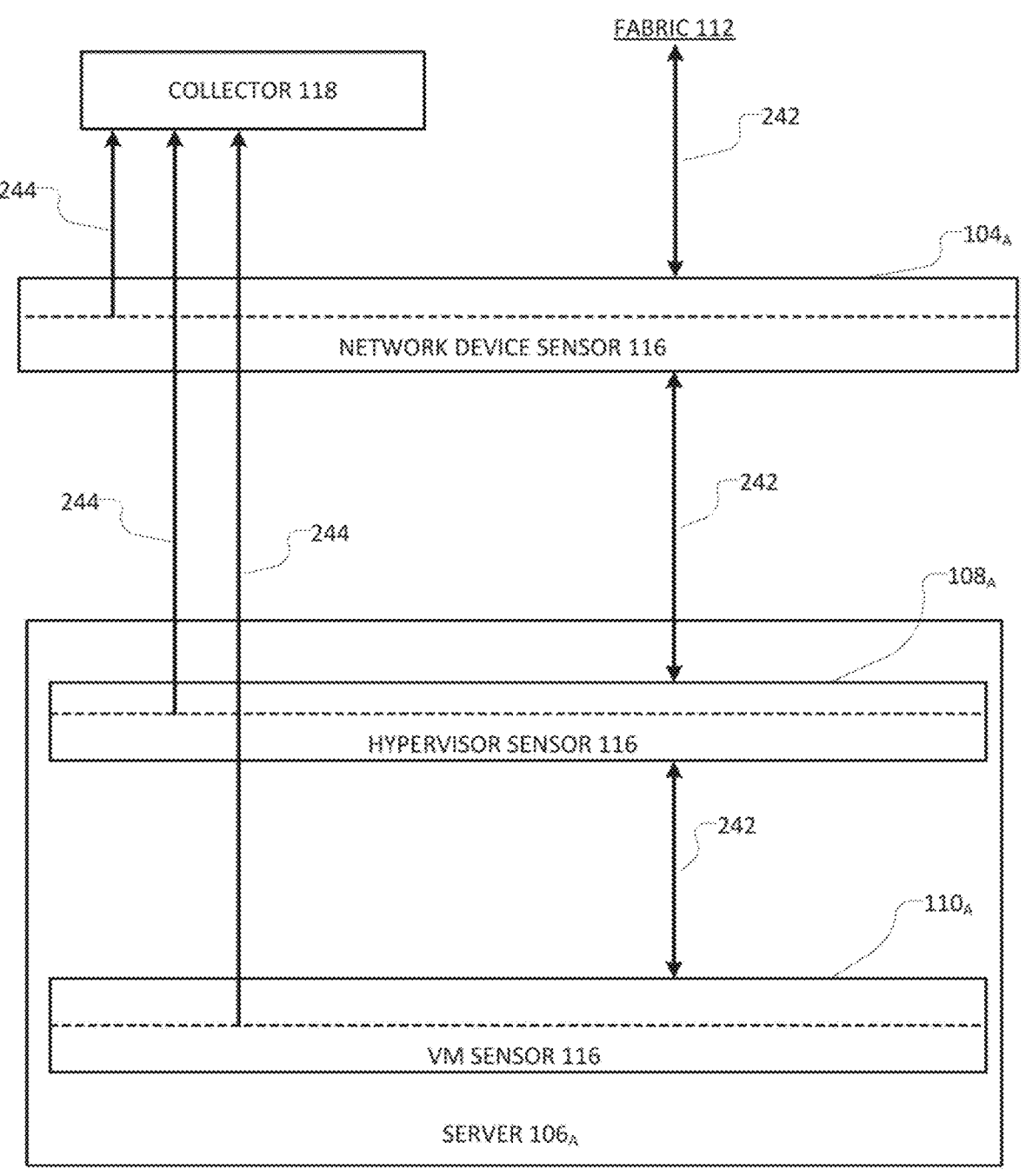
FIG. 2C illustrates a schematic diagram of an example reporting system for implementing various embodiments of the present technology.

FIG. 2C illustrates a schematic diagram of an example reporting system 240 in an example sensor topology. Leaf router $104_A$ can route packets or traffic 242 between fabric 112 and server $106_A$, hypervisor $108_A$, and VM $110_A$. Packets or traffic 242 between VM $110_A$ and leaf router $104_A$ can flow through hypervisor $108_A$ and server $106_A$. Packets or traffic 242 between hypervisor $108_A$ and leaf router $104_A$ can flow through server $106_A$. Finally, packets or traffic 242 between server $106_A$ and leaf router $104_A$ can flow directly to leaf router $104_A$. However, in some cases, packets or traffic 242 between server $106_A$ and leaf router $104_A$ can flow through one or more intervening devices or networks, such as a switch or a firewall.

Moreover, VM sensor 116 at VM $110_A$, hypervisor sensor 116 at hypervisor $108_A$, network device sensor 116 at leaf router $104_A$, and any server sensor at server $106_A$ (e.g., sensor running on host environment of server $106_A$), can send reports 244 to collector 118 based on the packets or traffic 242 captured at each respective sensor. Reports 244 from VM sensor 116 to collector 118 can flow through VM 110$_A$, hypervisor 108$_A$, server 106$_A$, and leaf router 104$_A$. Reports 244 from hypervisor sensor 116 to collector 118 can flow through hypervisor 108$_A$, server 106$_A$, and leaf router 104$_A$. Reports 244 from any other server sensor at server 106$_A$ to collector 118 can flow through server 106$_A$ and leaf router 104$_A$. Finally, reports 244 from network device sensor 116 to collector 118 can flow through leaf router 104$_A$.

Reports 244 can include any portion of packets or traffic 242 captured at the respective sensors. Reports 244 can also include other information, such as timestamps, process information, sensor identifiers, flow identifiers, flow statistics, notifications, logs, user information, system information, etc. Moreover, reports 244 can be transmitted to collector 118 periodically as new packets or traffic 242 are captured by a sensor. Further, each sensor can send a single report or multiple reports to collector 118. For example, each of the sensors 116 can be configured to send a report to collector 118 for every flow, packet, message, communication, or network data received, transmitted, and/or generated by its respective host (e.g., VM 110$_A$, hypervisor 108$_A$, server 106$_A$, and leaf router 104$_A$). As such, collector 118 can receive a report of a same packet from multiple sensors.

The reports 224 of sensors 116 can include timestamps associated with captured network traffic received, transmitted or generated by the host/node (VM 110$_A$, hypervisor 108$_A$, server 106$_A$, and leaf router 104$_A$). Sensors 116 can also associate a timestamp indicating when each of the sensors 116 transmits reports 224 to the collector 118. Regardless, the timestamps associated by sensors 226 can be based on a clock of the host/node (e.g. VM 110$_A$, hypervisor 108$_A$, server 106$_A$, and leaf router 104$_A$) where each of the respective sensors 116 resides.

For example, a packet received by VM 110$_A$ from fabric 112 can be captured and reported by VM sensor 116. Since the packet received by VM 110$_A$ will also flow through leaf router 104$_A$ and hypervisor 108$_A$, it can also be captured and reported by hypervisor sensor 116 and network device sensor 116. Thus, for a packet received by VM 110$_A$ from fabric 112, collector 118 can receive a report of the packet from VM sensor 116, hypervisor sensor 116, and network device sensor 116.

Similarly, a packet sent by VM 110$_A$ to fabric 112 can be captured and reported by VM sensor 116. Since the packet sent by VM 110$_A$ will also flow through leaf router 104$_A$ and hypervisor 108$_A$, it can also be captured and reported by hypervisor sensor 116 and network device sensor 116. Thus, for a packet sent by VM 110$_A$ to fabric 112, collector 118 can receive a report of the packet from VM sensor 116, hypervisor sensor 116, and network device sensor 116.

On the other hand, a packet originating at, or destined to, hypervisor 108$_A$, will can be captured and reported by hypervisor sensor 116 and network device sensor 116, but not VM sensor 116, as such packet would not flow through VM 110$_A$. Moreover, a packet originating at, or destined to, leaf router 104$_A$, will be captured and reported by network device sensor 116, but not VM sensor 116, hypervisor sensor 116, or any other sensor on server 106$_A$, as such packet would not flow through VM 110$_A$, hypervisor 108$_A$, or server 106$_A$.

Each of the sensors 116 can include a respective unique sensor identifier on each of the reports 244 it sends to collector 118, to allow collector 118 to determine which sensor sent the report. The reports 244 used to analyze network and/or system data and conditions for troubleshooting, security, visualization, configuration, planning, and management. Sensor identifiers in the reports 244 can also be used to determine which sensors reported what flows. This information can then be used to determine sensor placement and topology, as further described below. Sensor placement and topology information can be useful for analyzing the data in the reports 244, as well as troubleshooting, security, visualization, configuration, planning, and management.

Figure 2D:
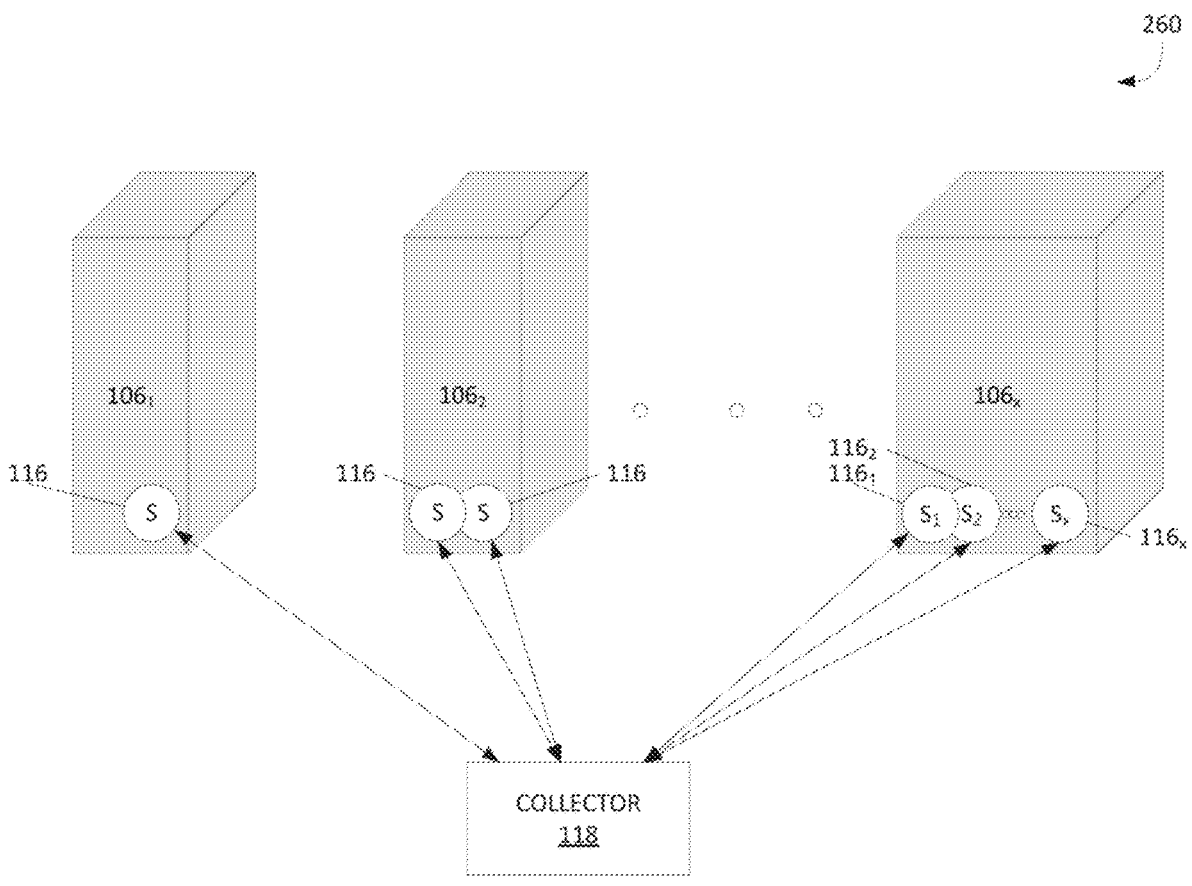
FIG. 2D illustrates a schematic diagram of an example sensor deployment for implementing various embodiments of the present technology.

FIG. 2D illustrates an example schematic diagram of an example sensor deployment in a computing network environment communicating collector. System 260 includes host 106$_1$, 106$_2$, . . . , 106$_x$ (herein described as host or node), sensors 116$_1$, 116$_2$, . . . 116$_x$ (herein described as sensor) and collector 118. As described above, host can include a container, virtual machine (VM), hardware network device (e.g., switch or router), hypervisor or physical server. Additionally, each host can include one or more sensors (e.g. sensor 116$_1$, 116$_2$, . . . 116$_x$). Furthermore, as described above, the sensor can be configured to capture activity (e.g., network traffic received, transmitted, or generated by the host), and report the captured activity (including any data and/or metadata) of the host where the sensor resides. Additionally, each report can include a timestamp based on the clock of the host and/or layer of the host where the sensor resides. Furthermore a node or host can have one sensor, or a node or host can have multiple sensors. For example host 106$_1$ includes one sensor 116. In another example host 106$_2$ has two sensors 116. Furthermore since each report includes a timestamp based on clock(s) where each of the sensors 116 resides, the timestamp of sensors 116 can be based on the same clock or different clock, depending on where sensors 116 reside. For example, assume the clocks of host 106$_1$ and 106$_2$ differ (i.e., are not synchronized). As such the timestamps of the report(s) of sensors 116 residing on host 106$_2$ are based on the same clock of host 106$_2$.

However the timestamp(s) of the report(s) of sensors 116 residing on host 106$_1$ can be different from the respective timestamp(s) of the report(s) of sensors 116 residing on host 106$_2$ because the clocks of host 106$_1$ and host 106$_2$ have different clocks. Therefore even if the reports from sensors are transmitted and/or generated at the same time, and/or even if the networking activities occurred at the same time at host 106$_1$ and host 106$_2$, the timestamp(s) of the report(s) of sensors 116 residing on host 106$_1$ and host 106$_2$ can still be different. For example, the report from sensor 116 residing on host 106$_1$ and the report from sensor 116 residing on host 106$_2$ capture the same network event occurring concurrently at the same time on both host 106$_1$ and host 106$_2$. However, the clocks of host 106$_1$ and host 106$_2$ are different. As such the timestamp of the report of sensor 116 residing on host 106$_1$ is 1 P.M. and the timestamp of the report of sensor 116 residing on host 106$_2$ is 2 P.M., even though both events reported are the same event and occurred simultaneously on both host 106$_1$ and host 106$_2$, at 1:15 P.M. Both timestamps are different even though they are intended to refer to the same event occurring at the same time.

The collector (e.g. collector 118) can be a group of processes running on a single machine or a cluster of machines capable of doing preprocessing and analysis of data collected from a sensor. The collector is configured to receive data from the one or more sensors. It should be noted that a system can include multiple collectors. However, for sake of simplicity, in this disclosure, all collectors are treated as one logical entity. Multiple sensors can report data to a collector. Moreover, a specific sensor can report data to a specific collector. Sensors and the collector are not limited to observing and processing just network data, but can also capture other information, such as, currently active processes, active file handles, socket handles, status of I/O devices, memory, etc.

In some situations, the clock of the collector is not synchronized with the clock of one or more hosts. As such, the collector may attribute an incorrect time to activities at the one or more hosts (which may affect its ability to identify sequence of events, correlate events, perform analytics of data flows and events, determine even lineage, etc.), because the collector or any other analytic engine could be receiving data reports with inconsistent timestamps. For example, one data report timestamp for an event or network activity of a host, occurs at 9 PM but the clock of the collector is at 8:30 PM when receiving the data report. This can present a challenge to the collector or any other entity when trying to analyze or interpret that data report.

Figures 3A, 3B:
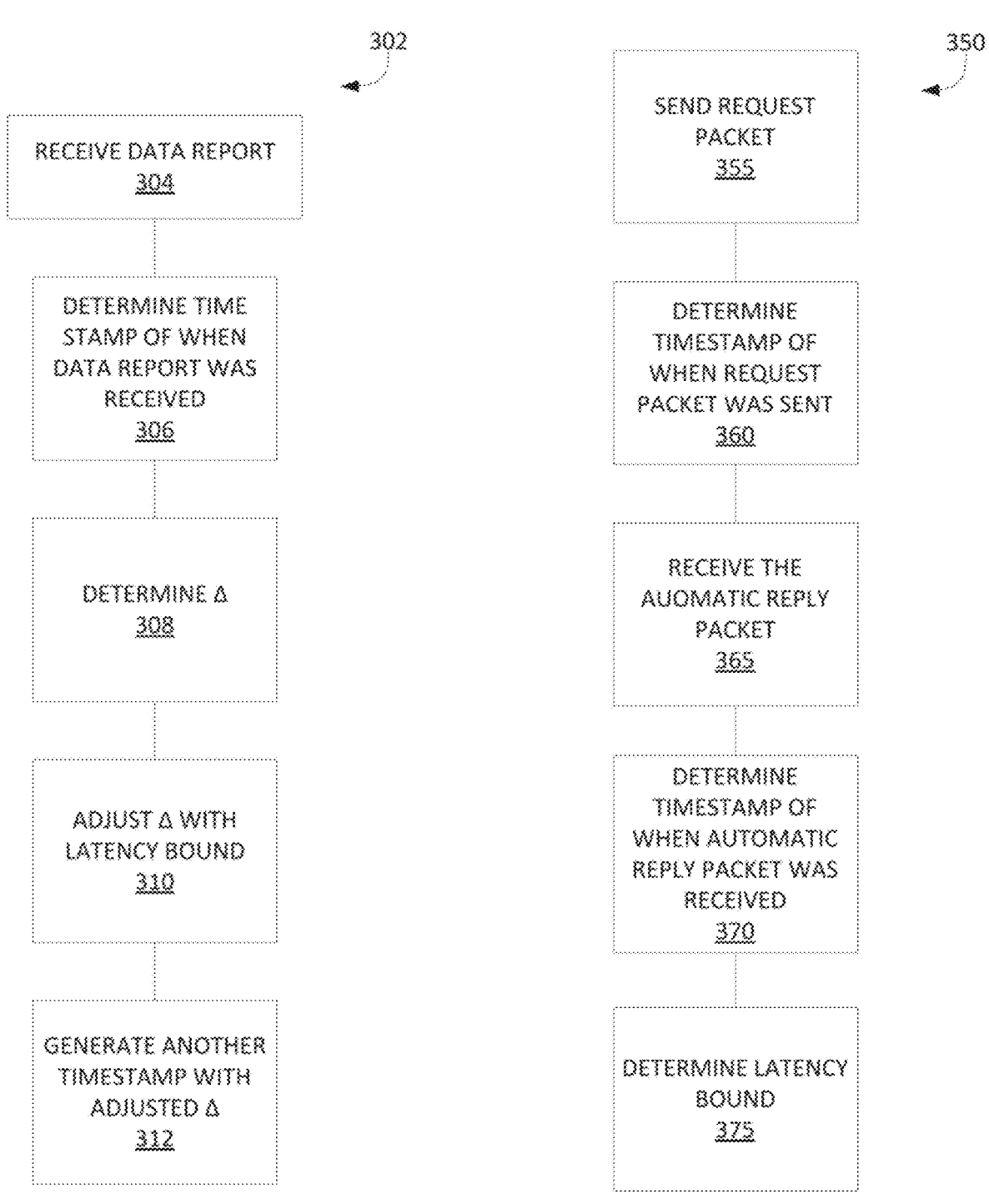
FIG. 3A illustrates an example method for determining the clock differences between a sensor and a collector in accordance with various embodiments of the present technology.
FIG. 3B illustrates an example method for determining a communication latency associated with a communication channel between a sensor and a collector in accordance with various embodiments of the present technology.

An example method to synchronize the timestamp of a sensor report to the clock of a collector is illustrated in FIG. 3A and FIG. 3B. The example method to synchronize can help alleviate the problem of the inconsistent timestamps of data reports, and associated reported data to respective times with greater accuracy. The example method is disclosed in two parts—the first part pertaining to the determination of delta(Δ) or the difference between the clock of the collector and the clock of the host/node, and the second part pertaining to the determination of a latency associated with a channel between a particular sensor and the collector. The collector can synchronize the timestamp of one or more reports from one or more sensors. The first part of the method is illustrated in FIG. 3A. FIG. 3A illustrates an example method for determining the clock differences or Δ between a sensor or multiple sensors residing on one or more hosts and a collector. Method 302 begins with a collector receiving a report from a sensor, of observed network activity of a host where the sensor resides. For example, as illustrated in FIG. 2D, sensors 116 at host $106_1$ (e.g. a server or virtual machine) sends a report of observed network activity of host $106_1$ to collector 118. The report includes a timestamp indicating when the sensor sent the report to collector 118, where the timestamp is based on the clock of the host where the sensor is located.

At step 306, the collector determines and associates a timestamp indicating when the collector received the data report. The second timestamp is based on the clock of the collector. For example, in FIG. 2D, once collector 118 receives the report from sensors 116, collector 118 determines and associates a timestamp indicating when the collector received the report from the sensor collector 118

At step 308, the collector determines the A. The A is the difference between the two timestamps (the timestamp indicating when the collector received the report from the sensor and the timestamp included in the data report indicating when the data report was generated and/or transmitted). By determining A, the collector can identify the clock of the sensor relative to the collector's clock. Furthermore since the clock of the sensor is based on the clock of the host system where the sensor resides, A also identifies the clock of the host relative to the collector's clock.

However, it can take time for a message or packet to travel from one node to another. As such some margin of error or latency can be present between a collector and a sensor. Latency can include a round-trip latency, a single hop latency, single leg latency, single path latency, network latency, system latency (e.g. processor or memory latencies), route-specific latency, etc. Determining a latency or latency range or bound associated with a communication channel between a sensor and a collector, determines an error margin of the identified A. At step 310, the collector adjusts A based on the determined communication latency. The determination of a latency associated with a communication channel between a sensor and a collector will be discussed later below, in further detail.

Once the collector adjusts A based on the determined latency, at step 312, the collector can generate a new timestamp based on the adjusted A. The collector can associate the new timestamp based on the adjusted A with the report. The collector can replace the timestamp of the data report with the new timestamp. This will synchronize the timestamp designated for the report to be relative to the clock of the collector. Additionally, the synchronized timestamp of the report can account for some margin of error based on the determined latency.

In some situations, synchronizing the timestamps/clocks of the host relative to the clock of the collector, can help determine a sequence of network activity or events reported. For example, sensors 116 send multiple data reports to collector 118. Each report, as discussed above, includes timestamps relative to the clock of the host (e.g. 8:31 AM, 8:32 AM, 8:33 AM . . . ) and data of observed network activity of the host. However the clock of the collector and the clock of the host are not synchronized (e.g. 7:00 AM). In accordance with the method above, collector 118 synchronizes the timestamps of the data reports from sensors 116 to the clock of collector 118 with an account for some margin of error based on the determined communication latency. As such, the collector or some other analytics engine determines a sequence of events. The collector or some other analytics engine can generate a timeline on a user interface (UI). The timeline can include various sensor reports that have been synchronized to the clock of the collector, which can include an account for some margin of error based on the determined latency for the sensor. The timeline can allow a user to visualize the sequence of events described for a particular host where the sensor is residing.

In some situations, synchronizing the timestamps/clocks of the host relative to the clock of the collector, can determine a sequence of network activity or events of a computing environment (e.g. multiple hosts in a network). For example, sensors 116 on host $106_1$ and host $106_2$ send multiple reports to collector 118. The report from sensors 116, includes a timestamp relative to the clock of host $106_1$ (e.g. 8:31 AM) and data of observed network activity of the host $106_1$. Similar to the report from sensors 116 on host $106_1$, $106_2$ includes data of observed network activity of the host including events, and a timestamp relative to the clock of host $106_2$ (e.g. 9:32 AM). However the clock of the collector and the clock of the host $106_1$ and $106_2$ are not synchronized (e.g. 7:00 AM). In accordance with the method above, the collector synchronizes the timestamps of the reports from sensors 116 on both host $106_1$ and $106_2$ to the clock of collector 118 with an account for some margin of error based on the determined latency for each sensor. As such, collector 118 or some other analytics engine determines a sequence of events captured from multiple sensors (e.g. $264_1$ and $264_2$). Collector 118 or some other analytics engine can generate a timeline on a UI of various events in the network environment. The timeline can include data reports that have been synchronized to the clock of the collector, which may account for some margin of error based on the determined latency associated with a communication channel of each sensors 116 and collector 118. The timeline can allow a user to visualize the sequence of events described in one or more data reports.

The adjustment of timestamps above can be helpful in the security context. For example, a malicious attack occurs over multiple hosts and/or processes. The disclosed techniques can reveal the sequence of the attacks over multiple hosts, the origin of the attack, the sequence of processes, the triggering events, and the relationships between triggers and events. For instance, referencing back to the example above, assume above process on host $106_1$ has triggered an attack or malicious event on host $106_2$. Since sensors 116 observe network activity of host $106_1$ and host $106_1$ respectively, sensors 116 data reports to collector 118. The report from sensors 116 on host $106_1$, includes a timestamp of the process relative to the clock of host $106_1$ (e.g. 8:34 AM) and data describing the process. The report from sensors 116 on host $106_2$ includes data describing the malicious attack or event, and a timestamp of the malicious attack or event relative to the clock of host $106_2$ (e.g. 8:32 AM). However the clock of the collector and the clock of the host $106_1$ and $106_2$ may not be synchronized (e.g. 7:00 AM). In accordance with the method above, collector 118 can synchronize the timestamps of each report from sensors 116 to the clock of the collector to estimate the time of each report relative to the clock of collector 118. The estimated times can also account for some margin of error based on the determined communication latency. As such, the collector or some other analytics engine can determine a sequence of the events at multiple sensors, and any relevant relationship details (e.g., lineage, etc.). In the example above, collector 118 or some other analytics engine can determine that the malicious attack originated with host $106_2$ and proceeded to host $106_1$ (assuming no other malicious attacks were reported by other sensors 116).

Furthermore, the collector or some other analytics engine can generate a timeline that includes synchronized data reports of one or more hosts, optionally with an account for some margin of error based on the determined communication latency. The timeline can allow a user to visualize the sequence of events of the malicious attack described in one or more data reports.

The collector can use a previously-calculated latency or error margin to synchronize the timestamps of the sensor reports until a predetermined threshold (e.g. time or detecting of abnormally large or small communication latency). For example, a collector can use a generated timestamp based on a current adjusted A until after a predetermined time threshold has passed. For instance, the predetermined time threshold is a day, and the collector will use a generated timestamp based on the current adjusted A until a day has passed. Once a day has passed, the collector can use the above described techniques to generate a new adjusted timestamp based on a newly determined latency, error margin, etc. The collector can then apply the newly generated latency and/or error margin on subsequently (after the new timestamp has been generated) received sensor reports until another day has passed.

FIG. 3B illustrates an example method for determining a communication latency associated with the communication channel between the collector and the sensor(s). The communication latency can be calculated before or after determining A.

Method 350 begins at step 355 where the collector sends a request message to a sensor, such as a heartbeat or request-reply message. The request message requests the sensor to send a reply message to the collector. As such, once the sensor receives the request message, the sensor sends a reply message back to the collector. The sensor can use the same channel as with the transmission of the request packet by the collector. The sensor can also use a different channel than the channel used for transmitting the request packet by the collector. The reply message includes a timestamp indicating when the sensor sent the reply message based on the host clock of where the sensor resides. Additionally, at step 360, when the collector sends a request message to the sensor, the collector can associate a timestamp for when the collector sent the request packet. For example, as illustrated in FIG. 4A, collector 118 sends a request packet to sensors 116 and associates a timestamp of when collector 118 sent the request packet.

At step 365, collector 118 receives the automatic reply packet from sensors 116, and at step 370, collector 118 determines a time and/or associates a timestamp indicating when the collector received the automatic reply packet. For example, in FIG. 5B, since the request packet is configured to trigger automatic reply by the sensors 116, immediately sends a reply packet to collector 118. Collector 118 then determines and/or associates with the reply packet a time-stamp indicating when collector 118 received the reply packet.

At step 375, the collector determines a communication latency or range. The communication latency can include the time for a packet to make a round trip between a sensor and a collector. In FIG. 4B, the communication latency of interest is the round trip time it takes for a packet to travel between sensors 116 and collector 118, using the same channel. As discussed above, the communication latency can be used to calculate a margin of error for the adjusted A. Collector 118 can determine a communication latency based on one or more reply messages. For example, collector 118 can determine the latency based on the average of the between the timestamp indicating when collector 118 sent the request message to sensors 116 on a communication channel, and the timestamp indicating when the collector received the reply message from sensors 116 on the same communication channel.

The collector can determine a communication latency by also incorporating the timestamp included in the reply packet from the sensor. For instance, the collector can add the new timestamp based on the adjusted A with the report. As such the report can include both the new timestamp and the timestamp based on the clock of the sensor. For example, as illustrated in FIG. 2D, collector 118 can add the new timestamp based on the adjusted A with the report from sensor 116 of host $106_1$. As such the report can have both the new timestamp and the time stamp based on the clock of host $106_1$ where sensor 116 is located.

The collector can determine A and the associated communication latency continuously on a periodic basis to ensure the collector maintains accuracy over time.

Using the above described techniques, the collector can also determine multiple communication latency for a single determination of A. For example, the collector can send multiple request messages to a sensor, to determine multiple communication latency ranges of one channel. Additionally, the collector can determine or associate a timestamp indicating when the collector sent the request messages. Once the sensor(s) receives the request messages, the sensor(s) can send a reply message back to the collector. Each reply message includes a timestamp indicating when the sensor sent the reply message to the collector and each timestamp can be based on the clock of the host where the sensor resides. After the collector receives the reply messages from the sensor, the collector determines or associates another timestamp indicating when the collector received the reply messages from the sensor. The collector can calculate respective latencies based on the timestamps associated with each request-reply message. Once the collector determines communication latency ranges for all request packets (e.g. determining the difference between the timestamp indicating when the collector sent the request message and the timestamp of when the collector received the reply message), the collector determines a communication latency and/or range to apply to the determined A.

The collector can store a history of communication latency associated with a communication channel between a collector and a sensor communicating with that collector (herein described as the historical fashion). Based on the history of communication latencies associated with a communication channel between each sensor and the collector, the collector can determine a historical communication latency to apply to the A. Additionally, the collector can calculate the media or average of multiple historical communication latency. Furthermore, the collector can determine abnormal historical communication latency (e.g. communication latency that are either unusually large or small compared to the average historical communication latency or the median historical communication latency). The collector can identify the abnormal latency and determine whether to include or exclude any.

The collector can determine communication latency in either in a historical fashion or in the other methods described above. For example, in some embodiments, the collector selects a communication latency based one or more predetermined condition. For example, the collector determines the historical fashion includes a few abnormally large or abnormally small communication latency, as compared to the average historical communication latency. As such, instead, the collector selects the communication latency based on the method described in FIG. 3B. In some embodiments, the predetermined threshold is based on a predetermined time. For instance, after a predetermined time, the collector selects the communication latency based on any of the above described techniques.

The collector or some other analytics engine can use all of the above-described techniques to synchronize or adjust all the internal clocks of the hosts in the data center. This of course assumes that the collector has complete access to the host or the system of the data center. For example, the collector determines an adjusted A based on the determined communication latency of a particular sensor. In turn the collector adjusts or synchronizes the internal clock of the host where the particular sensor resides based on the adjusted A. Furthermore, in some embodiments this can be done for all the hosts with sensors operatively communicating with the collector.

Figure 5:
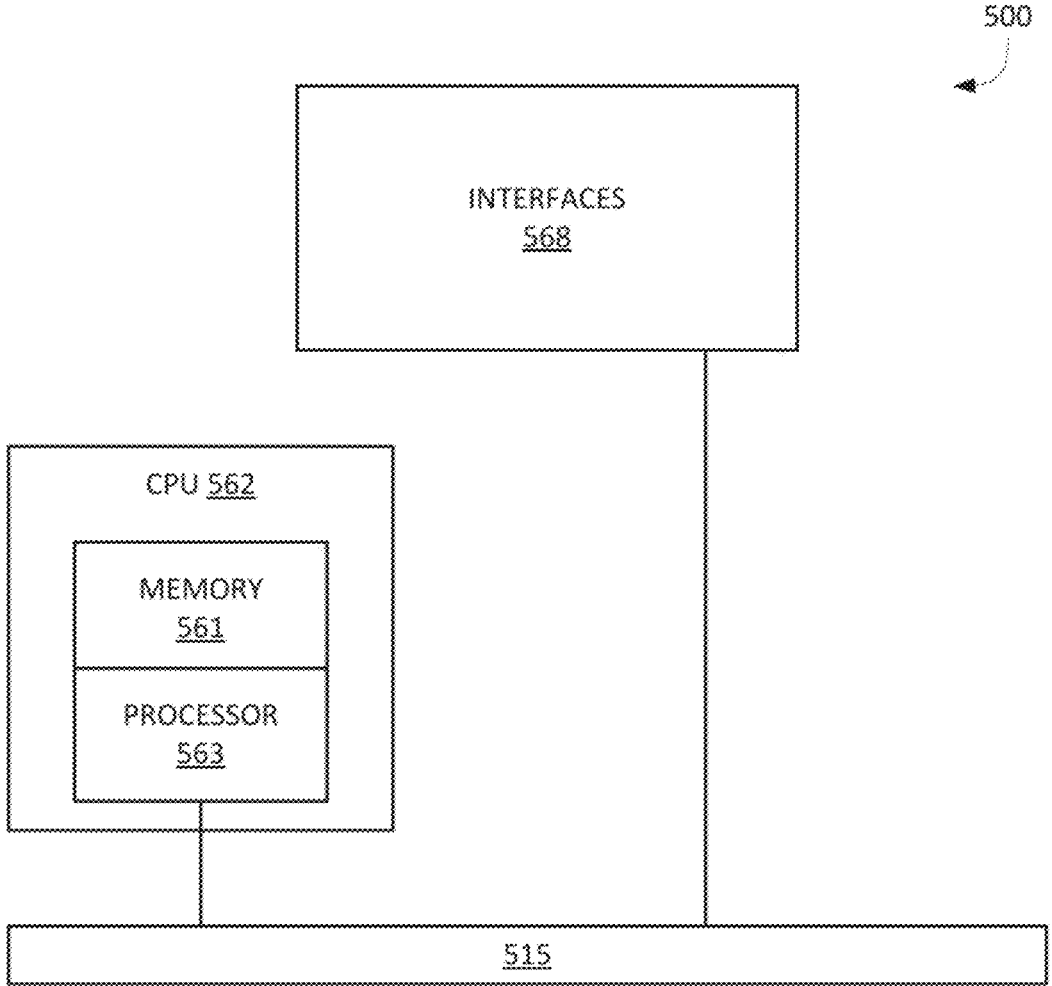
FIG. 5 illustrates an example network device.

FIG. 5 illustrates an example network device 510 according to some embodiments. Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing functions. The CPU 562 preferably accomplishes all these functions under the control of software including an operating system and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6A:
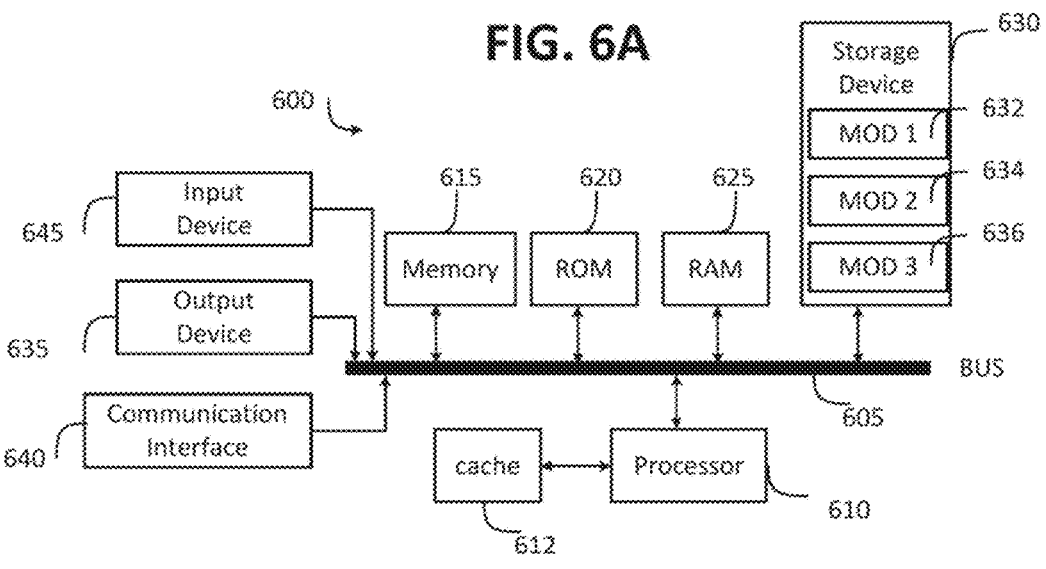
FIGS. 6A and 6B illustrate example system embodiments.
Figure 6B:
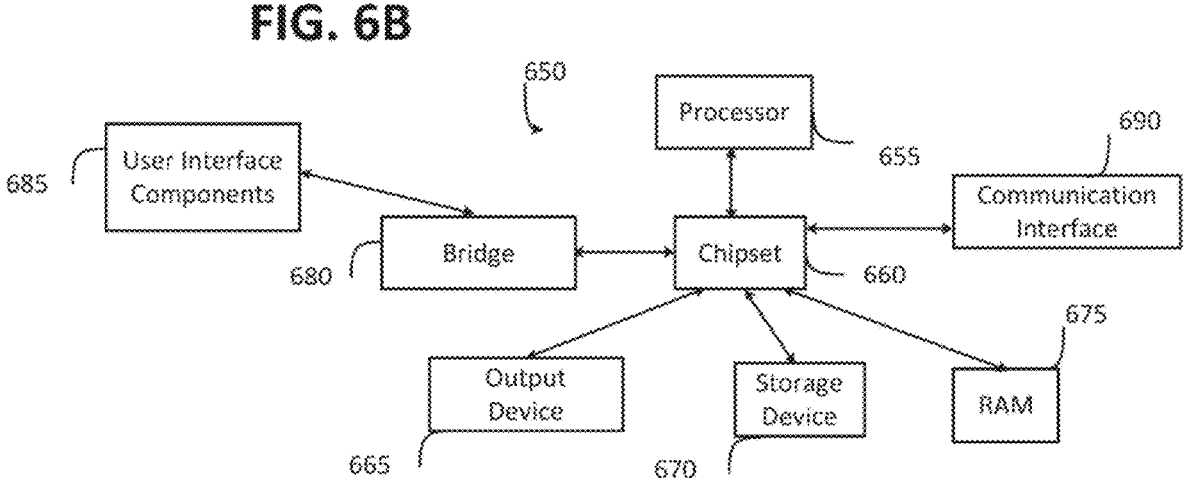

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 670 and random access memory (RAM) 675, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 637, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 675, read only memory (ROM) 680, and hybrids thereof.

The storage device 630 can include software modules 638, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655. It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A computer-implemented method, comprising:
   receiving, by a device, network activity data from a first sensor and a second sensor, wherein the first and second sensors are associated with a network node relative to a clock of the network node and wherein the network activity data is associated with at least one timestamp and the network activity data includes network traffic traversing a network;
   determining a delta between the at least one timestamp and a second timestamp determined by the device relative to a clock of the device;
   determining a latency of a communication channel between the device and the network node;
   adjusting the delta based on the latency;
   generating a report that includes a new timestamp by synchronizing the at least one timestamp and second timestamp with the adjusted delta associated with the network activity data; and
   synchronizing the report with a plurality of other reports from network activity data of a plurality of other sensors.

2. The method of claim 1, wherein the at least one timestamp indicates when the sensor sent a report to a collector and is based on a clock of the network node.

3. The method of claim 1, further comprising:
   generating a timeline from the report and a plurality of other reports from other devices.

4. The method of claim 1, wherein the latency is determined on a periodic basis.

5. The method of claim 1, wherein the latency is precalculated.

6. The method of claim 1, determining the latency further comprising:
   sending a request message to the sensor;
   receiving an automatic reply packet from the sensor;
   determining a timestamp of when the automatic reply packet was received; and
   determining the latency based on the timestamp of when the automatic reply packet was received and a timestamp of when the request message was sent.

7. A device, comprising:
   one or more processors;
   memory including instructions that, when executed by the one or more processors, cause the device to:
      receive network activity data from a first sensor and a second sensor, wherein the first and second sensors are associated with a network node relative to a clock of the network node and wherein the network activity data is associated with at least one timestamp and the network activity data includes network traffic traversing a network;
      determine a delta between the at least one timestamp and a second timestamp determined by the device relative to a clock of the device;

determine a latency of a communication channel between the device and the network node;
      adjust the delta based on the latency;
      generate a report that includes a new timestamp by synchronizing the at least one timestamp and second time stamp with the adjusted delta associated with the network activity data; and
      synchronizing the report with a plurality of other reports from network activity data of a plurality of other sensors.

8. The device of claim 7, wherein the at least one timestamp indicates when the first or second sensor sent a report to a collector and is based on a clock of the network node.

9. The device of claim 7, further comprising instructions, which when executed by the one or more processors, cause the device to:
   generate a timeline from the report and a plurality of other reports from other devices.

10. The device of claim 7, wherein the latency is determined on a periodic basis.

11. The device of claim 7, wherein the latency is precalculated.

12. The device of claim 7, further comprising instructions, which when executed by the one or more processors, cause the device to:
   send a request message to the sensor;
   receive an automatic reply packet from the sensor;
   determine a timestamp of when the automatic reply packet was received; and
   determine the latency based on the timestamp of when the automatic reply packet was received and a timestamp of when the request message was sent.

13. A non-transitory computer-readable medium including instructions that, when executed by one or more processors of a device, cause the device to:
   receive network activity data from a first sensor and a second sensor, wherein the first and second sensors are associated with a network node relative to a clock of the network node and wherein the network activity data is associated with at least one timestamp and the network activity data includes network traffic traversing a network;
   determine a delta between the at least one timestamp and a second timestamp determined by the device relative to a clock of the device;
   determine a latency of a communication channel between the device and the network node;
   adjust the delta based on the latency;
   generate a report that includes a new timestamp by synchronizing the at least one timestamp and second time stamp with the adjusted delta associated with the network activity data; and
   synchronizing the report with a plurality of other reports from network activity data of a plurality of other sensors.

14. The non-transitory computer-readable medium of claim 13,
   wherein the at least one timestamp indicates when the first or second sensor sent a report to a collector and is based on a clock of the network node.

15. The non-transitory computer-readable medium of claim 13, wherein the latency is determined on a periodic basis.

16. The non-transitory computer-readable medium of claim 13, wherein the latency is precalculated.

17. The non-transitory computer-readable medium of claim 13, further comprising instructions, which when executed by the one or more processors, cause the device to:

send a request message to the sensor;

receive an automatic reply packet from the sensor;

determine a timestamp of when the automatic reply packet was received; and determine the latency based on the timestamp of when the automatic reply packet was received and a timestamp of when the request message was sent.

18. The method of claim 1, wherein the network node is a routing or switching device.

19. The method of claim 1, wherein the network node is a server.

\* \* \* \* \*